US010995396B2

United States Patent
Ueda et al.

(10) Patent No.: US 10,995,396 B2
(45) Date of Patent: May 4, 2021

(54) RAIL

(71) Applicant: NIPPON STEEL & SUMITOMO METAL CORPORATION, Tokyo (JP)

(72) Inventors: Masaharu Ueda, Tokyo (JP); Teruhisa Miyazaki, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 165 days.

(21) Appl. No.: 16/098,987

(22) PCT Filed: May 19, 2017

(86) PCT No.: PCT/JP2017/018873
§ 371 (c)(1),
(2) Date: Nov. 5, 2018

(87) PCT Pub. No.: WO2017/200096
PCT Pub. Date: Nov. 23, 2017

(65) Prior Publication Data
US 2019/0161839 A1 May 30, 2019

(30) Foreign Application Priority Data
May 19, 2016 (JP) .............................. JP2016-100119

(51) Int. Cl.
*C21D 9/04* (2006.01)
*C22C 38/60* (2006.01)
(Continued)

(52) U.S. Cl.
CPC ............ *C22C 38/60* (2013.01); *C21C 5/5211* (2013.01); *C21C 5/5264* (2013.01); *C21D 9/04* (2013.01);
(Continued)

(58) Field of Classification Search
CPC .......... C21C 2007/0012; C21C 5/5211; C21C 5/5264; C21D 2211/004; C21D 2211/009; C21D 9/04; C22C 38/60; Y02P 10/216
(Continued)

(56) References Cited

U.S. PATENT DOCUMENTS

| 8,980,019 B2 * | 3/2015 | Ueda ....................... C22C 38/54 |
| | | 148/333 |
| 2011/0226389 A1 | 9/2011 | Ueda et al. |
| 2015/0136864 A1 * | 5/2015 | Ueda ....................... C22C 38/02 |
| | | 238/150 |

FOREIGN PATENT DOCUMENTS

| JP | 57-198216 A | 12/1982 |
| JP | 2-247357 A | 10/1990 |

(Continued)

OTHER PUBLICATIONS

NPL: on-line translation of JP2001059137A, Mar. 2001 (Year: 2001).*

(Continued)

*Primary Examiner* — Jie Yang
(74) *Attorney, Agent, or Firm* — Birch, Stewart, Kolasch & Birch, LLP

(57) ABSTRACT

A rail according to an aspect of the present invention is manufactured by melting steel using an electric furnace, satisfies a predetermined range as a chemical composition and particularly includes Pb: 0.0003% to 0.0020%, 95 area % or more of a region from an outer surface of a head portion to a depth of 20 mm is a pearlite structure, and a hardness in the region from the outer surface of the head portion to the depth of 20 mm is in a range of Hv 300 to Hv 500.

4 Claims, 7 Drawing Sheets

(51) Int. Cl.
*C21C 5/52* (2006.01)
*C22C 38/00* (2006.01)
*C22C 38/02* (2006.01)
*C22C 38/04* (2006.01)
*C22C 38/06* (2006.01)
*C22C 38/10* (2006.01)
*C22C 38/12* (2006.01)
*C22C 38/14* (2006.01)
*C22C 38/16* (2006.01)
*C22C 38/18* (2006.01)
*C21C 7/00* (2006.01)

(52) U.S. Cl.
CPC .......... *C22C 38/002* (2013.01); *C22C 38/005* (2013.01); *C22C 38/02* (2013.01); *C22C 38/04* (2013.01); *C22C 38/06* (2013.01); *C22C 38/10* (2013.01); *C22C 38/12* (2013.01); *C22C 38/14* (2013.01); *C22C 38/16* (2013.01); *C22C 38/18* (2013.01); *C21C 2007/0012* (2013.01); *C21D 2211/004* (2013.01); *C21D 2211/009* (2013.01); *Y02P 10/20* (2015.11)

(58) Field of Classification Search
USPC ........................................................ 148/569
See application file for complete search history.

(56) References Cited

FOREIGN PATENT DOCUMENTS

| | | |
|---|---|---|
| JP | 5-263121 A | 10/1993 |
| JP | 7-173530 A | 7/1995 |
| JP | 8-144016 A | 6/1996 |
| JP | 2001-40453 A | 2/2001 |
| JP | 2001-59137 A | 3/2001 |
| JP | 2001-220651 A | 8/2001 |
| JP | 2001-234238 A | 8/2001 |
| JP | 2002-226915 A | 8/2002 |
| WO | WO 2011/021582 A1 | 2/2011 |

OTHER PUBLICATIONS

International Search Report for PCT/JP2017/018873 dated Aug. 8, 2017.
Written Opinion of the International Searching Authority for PCT/JP2017/018873 (PCT/ISA/237) dated Aug. 8, 2017.

* cited by examiner

RAIL

TECHNICAL FIELD OF THE INVENTION

The present invention relates to a rail manufactured by melting steel using an electric furnace.

Priority is claimed on Japanese Patent Application No. 2016-100119, filed on May 19, 2016, the content of which is incorporated herein by reference.

RELATED ART

With economic development, new developments in natural resources such as coal have proceeded. Specifically, mining of natural resources in regions which have not been developed yet and have severe natural environments has proceeded. Along with this, track environments for heavy load freight railroads that transport resources become significantly strict. For rails, higher wear resistance than before has been required. From this background, the development of a rail with improved wear resistance has been required.

In order to improve the wear resistance of rail steel, high strength rails as described in Patent Documents 1 and 2 have been developed. The main feature of such rails is that in order to improve wear resistance, the hardness of steel is increased by refining a pearlite lamellar spacing through a heat treatment, or the volume fraction of the cementite in pearlite lamellae is increased by increasing the amount of carbon in steel.

In a technique disclosed in Patent Document 1, it is possible to provide a rail having excellent wear resistance by, immediately after the finish of rolling, or after cooling and reheating after the finish of rolling, subjecting a head portion of the rail to accelerated cooling from an austenite range temperature to a cooling end temperature within a range of 850° C. to 500° C. at a cooling rate of 1° C./s to 4° C./s.

In a technique disclosed in Patent Document 2, it is possible to provide a rail having excellent wear resistance by increasing the volume fraction of cementite in lamellae in a pearlite structure using hyper-eutectoid steel (C: more than 0.85% to 1.20%).

In the techniques disclosed in Patent Documents 1 and 2, in heavy load freight railroads, an improvement in wear resistance in a certain range can be achieved by achieving an increase in hardness through refinement of a lamellar spacing in the pearlite structure, or increasing the volume fraction of cementite in the lamellae in the pearlite structure. However, the techniques disclosed in Patent Documents 1 and 2 have a problem that the toughness of the pearlite structure itself significantly decreases, and rail breakage is likely to occur.

From this background, it is desirable to provide a pearlitic rail having excellent wear resistance and toughness, in which the wear resistance of a pearlite structure is improved and the toughness is simultaneously improved.

In general, in order to improve the toughness of pearlite steel, it is said that refinement of a pearlite structure, specifically, refinement of an austenite structure before pearlitic transformation or refinement of a pearlite block size is effective. In order to achieve the refinement of the austenite structure, a decrease in a hot rolling temperature and an increase in a reduction amount during hot rolling, and a heat treatment by low temperature reheating after rail rolling are carried out. In addition, in order to achieve the refinement of the pearlite structure, acceleration of pearlitic transformation from austenite grains using transformation nuclei, and the like are carried out.

However, in the manufacturing of rails, from the viewpoint of securing formability during hot rolling, there is a limit to the decrease in the rolling temperature and the increase in the reduction amount, so that sufficient refinement of austenite grains could not be achieved. In addition, regarding the pearlitic transformation from the austenite grains using the transformation nuclei, there are problems of a difficulty in controlling the amount of transformation nuclei, unstable pearlitic transformation from grains, and the like, so that sufficient refinement of the pearlite structure could not be achieved.

In view of these problems, in order to radically improve the toughness of the rail having the pearlite structure, a method of refining a pearlite structure by performing low temperature reheating after rail rolling and thereafter allowing pearlitic transformation to occur by accelerated cooling has been used. However, in recent years, due to a higher carbon content in a rail for the improvement in wear resistance, coarse carbide remains unmelted in austenite grains during the low temperature reheating heat treatment, and there is a problem that the ductility or toughness of the pearlite structure after the accelerated cooling decreases. In addition, in a case where reheating of the rail is essential for rail manufacturing, there are also economic problems such as high manufacturing costs and low productivity.

Therefore, the development of a manufacturing method of a high carbon steel rail in which formability during hot rolling is secured and a pearlite structure is refined after the hot rolling is required. In order to solve this problem, manufacturing methods of a high carbon steel rail as described in Patent Documents 3 to 5 are developed. The main feature of these manufacturing methods is that in order to refine a pearlite structure, the fact that austenite grains of high carbon steel are easy to recrystallize at a relatively low temperature and a small reduction amount is used. Accordingly, fine grains of regulated grain size are obtained by continuous rolling at a small reduction, thereby improving the ductility or toughness of pearlite steel.

In a technique disclosed in Patent Document 3, it is possible to provide a high toughness rail by performing hot rolling of three or more consecutive passes at a time between predetermined rolling passes during finish rolling of a steel rail using high carbon steel.

In a technique disclosed in Patent Document 4, it is possible to provide a high wear resistance and high toughness rail by performing rolling of two or more consecutive passes at a time between predetermined rolling passes, further performing continuous rolling, and thereafter performing accelerated cooling after the hot rolling during finish rolling of a steel rail using high carbon steel.

In a technique disclosed in Patent Document 5, it is possible to provide a high wear resistance and high toughness rail by performing cooling between passes, performing continuous hot rolling, and thereafter performing accelerated cooling after the hot rolling during finish rolling of a steel rail using high carbon steel.

However, even if the techniques disclosed in Patent Documents 3 to 5 are applied, there may be cases where the toughness of the rail decreases, and an object is to develop a technique in which wear resistance is secured and toughness is stably improved at the same time.

Here, control of inclusions in steel, which are elements that make toughness unstable, is required. In order to solve this problem, manufacturing methods of a high carbon steel rail as described in Patent Documents 6 and 7 are developed.

The main feature of these manufacturing methods is a technique in which the addition of deoxidizing elements or a vacuum treatment is applied in order to suppress the formation of MnS and $Al_2O_3$, which are representative inclusions of rails, and thus the amount of oxygen contained in molten steel is reduced as much as possible, thereby reducing the amount of inclusions in the molten steel. Accordingly, the techniques of Patent Documents 6 and 7 improve the toughness of the rails.

A technique disclosed in Patent Document 6 proposes a manufacturing method of high carbon and high purity molten steel in which the amount of MnO inclusions is reduced and thus the amount of elongated MnS inclusions, which precipitate from MnO as the origin, is reduced. In this technique, molten steel is produced in an atmospheric refining furnace, is thereafter taken out in an undeoxidized or weakly deoxidized state, is subjected to a vacuum treatment at a vacuum degree of 1 Torr or less to cause dissolved oxygen in the molten steel to be 30 ppm or less. Subsequently, Al and Si are added to the molten steel, and Mn is thereafter added to the molten steel, whereby the number of secondary deoxidation products to become crystallization nuclei of MnS, which is crystallized in the final solidified portion, is reduced, and the concentration of MnO in oxides is reduced to suppress crystallization of MnS.

A technique disclosed in Patent Document 7 proposes a manufacturing method of a rail in which the amount of oxygen and the amount of Al in steel are reduced. In this technique, it is possible to manufacture a rail having excellent damage resistance by limiting the total oxygen amount based on the relationship between the total oxygen value and the damage resistance of oxide-based inclusions. Furthermore, the technique of Patent Document 7 improves the damage resistance and toughness of the rail by limiting the amount of solid solution Al or the composition of inclusions to a preferable range.

However, in recent years, higher toughness is required of a rail, and there may be cases where the toughness of the rail is insufficient even when the techniques disclosed in Patent Documents 6 and 7 are applied. Therefore, an object is to develop a technique in which wear resistance is secured and toughness is stably improved at the same time.

Here, control of impurities in steel, which are elements that make toughness unstable, is required. In order to solve this problem, a high strength pearlitic rail and a manufacturing method thereof as described in Patent Document 8 is developed. The main feature of the rail is a technique in which P in a solid solution state as an element that reduces toughness is fixed as phosphide. Accordingly, the technique of Patent Document 8 improves the toughness of the rail.

In the technique disclosed in Patent Document 8, Zr, Nb, Ti, and Mo are added to a rail to fix solid solution P, which is an element that reduces toughness, as phosphides of Zr, Nb, Ti, and Mo, thereby reducing the amount of solid solution P and improving the toughness of pearlite steel.

However, there may be cases where the toughness of a rail particularly for heavy load freight railroads is insufficient even when the technique disclosed in Patent Document 8 is applied. Therefore, an object is to develop a technique in which wear resistance is secured and toughness is stably improved at the same time.

PRIOR ART DOCUMENT

Patent Document

[Patent Document 1] Japanese Unexamined Patent Application, First Publication No. S57-198216

[Patent Document 2] Japanese Unexamined Patent Application, First Publication No. H8-144016

[Patent Document 3] Japanese Unexamined Patent Application, First Publication No. H7-173530

[Patent Document 4] Japanese Unexamined Patent Application, First Publication No. 2001-234238

[Patent Document 5] Japanese Unexamined Patent Application, First Publication No. 2002-226915

[Patent Document 6] Japanese Unexamined Patent Application, First Publication No. H5-263121

[Patent Document 7] Japanese Unexamined Patent Application, First Publication No. 2001-220651

[Patent Document 8] Japanese Unexamined Patent Application, First Publication No. 2001-40453

DISCLOSURE OF THE INVENTION

Problems to be Solved by the Invention

The present invention has been invented taking the foregoing problems into consideration, and particularly, an object thereof is to provide a rail for heavy load freight railroads for the purpose of remarkably improving wear resistance and toughness (impact value).

Means for Solving the Problem

The gist of the present invention resides in a rail described below.

(1) According to an aspect of the present invention, a rail manufactured by melting steel using an electric furnace includes, as a chemical composition, by unit mass %: C: 0.75% to 1.20%; Si: 0.10% to 2.00%; Mn: 0.10% to 2.00%; P≤0.0250%; S≤0.0250%; Pb: 0.0003% to 0.0020%; a group a: one or two of Cr: 0% to 2.00% and Mo: 0% to 0.50%; a group b: Co: 0% to 1.00%; a group c: B: 0% to 0.0050%; a group d: one or two of Cu: 0% to 1.00% and Ni: 0% to 1.00%; a group e: one or two or more of V: 0% to 0.50%, Nb: 0% to 0.0500%, and Ti: 0% to 0.0500%; a group f: one or two or more of Mg: 0% to 0.0200%, Ca: 0% to 0.0200%, and REM: 0% to 0.0500%; a group g: Zr: 0% to 0.0200%; a group h: Al: 0% to 1.0000%; a group i: N: 0% to 0.0200%; and a remainder including Fe and impurities, in which 95 area % or more of a region from an outer surface of a head portion to a depth of 20 mm is a pearlite structure, and a hardness in the region from the outer surface of the head portion to the depth of 20 mm is in a range of Hv 300 to Hv 500.

(2) In the rail according to (1), an average number density of Pb oxide-based inclusions having a grain size of 1.0 μm to 5.0 μm may be 100 pieces/1000 μm' or less, in a cross-section of the region from the outer surface of the head portion to the depth of 2 mm to 20 mm.

(3) The rail according to (1) or (2) may include, as the chemical composition, by unit mass %: one group or two or more groups of, a group a: one or two of Cr: 0.10% to 2.00% and Mo: 0.01% to 0.50%; a group b: Co: 0.01% to 1.00%; a group c: B: 0.0001% to 0.0050%; a group d: one or two of Cu: 0.01% to 1.00% and Ni: 0.01% to 1.00%; a group e: one or two or more of V: 0.01% to 0.50%, Nb: 0.0010% to 0.0500%, and Ti: 0.0030% to 0.0500%; a group f: one or two or more of Mg: 0.0005% to 0.0200%, Ca: 0.0005% to 0.0200%, and REM: 0.0005% to 0.0500%; a group g: Zr: 0.0001% to 0.0200%; a group h: Al: 0.0050% to 1.0000%; and a group i: N: 0.0050% to 0.0200%.

Effects of the Invention

In the rail according to the present invention, by controlling the amount of an element included in rail steel, particularly the Pb content, wear resistance and toughness are improved, and the service life is improved.

EMBODIMENTS OF THE INVENTION

Figure 1:
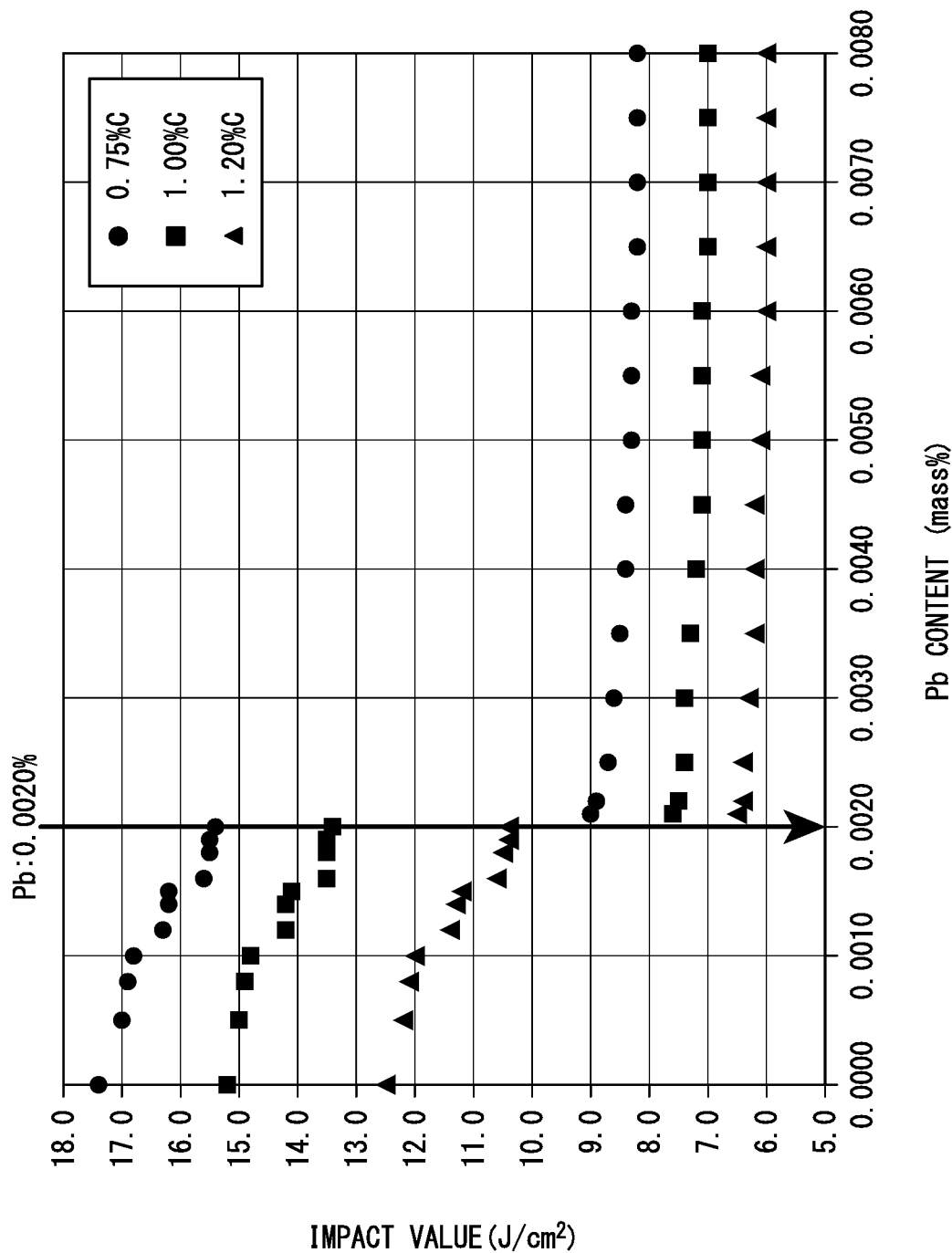
FIG. 1 is a graph showing the relationship between the Pb content of a rail and the impact value of the rail.

The inventors examined a method for stably improving the toughness of a rail for heavy load freight railroads. For this, a commercially available rail for freight railroads was obtained to investigate the relationship between impurities contained therein and the toughness of the rail in more detail than before. In particular, trace amounts of impurity elements, which are considered not to affect rail properties according to the related art, were objects to be analyzed in detail. The ranges of primary elements of the rail used for the examination, manufacturing conditions, and toughness evaluation test conditions are as described below. Hereinafter, the unit "mass %" of an alloying element content is simply described as "%".

[Alloying Elements of Rail]
Ranges of chemical composition: 0.75% to 1.20% of C-0.10% to 2.00% of Si-0.10% to 2.00% of Mn-0.0020% to 0.0250% of P-0.0020% to 0.0250% of S The above-mentioned ranges of the chemical composition are disclosed in the mill sheet (attached documents certifying the materials of a steel) prepared by the manufacturer of the rail obtained by the inventors. However, when the inventors analyzed the chemical composition of the rail, the rail contained elements other than C, Si, Mn, P, and S. Typically, although the C content, the Si content, the Mn content, the P content and the S content (primary five elements) are disclosed in the mill sheet of steel, the disclosure of the amounts of other elements may be omitted in some cases.

[Basic Properties of Rail]
Metallographic structure of a head surface portion of the rail: pearlite (area ratio of 95% or more)
Hardness at the head surface portion of the rail: Hv 300 to Hv 500
[Evaluation Test of Toughness]
Test method: impact test
Test piece: JIS No. 3, 2 mm U-notch
Test piece taking position: 2 mm below an outer surface of a head portion of the rail (see FIG. 6, a notch position is 4 mm below the outer surface of the head portion of the rail)
Test temperature: room temperature (+20° C.)

As a result of the impact test, it was found that the impact value (that is, toughness) of the rail varies. This variation was thought to be caused by factors other than the primary elements described in the mill sheet. As a result of detailed analysis of rail steel having low toughness, it became obvious that, as an element other than the above-mentioned primary elements (C, Si, Mn, P, and S), the influence of the Pb content presumed to be incorporated from scrap when molten steel is manufactured in an electric furnace is extremely significant.

The inventors performed a detailed investigation by controlling particularly the Pb content of the rail, and as a result, confirmed that it is necessary to control the Pb content in order to stably improve the toughness. In particular, the inventors found that there are cases where even a trace amount of Pb contained as an impurity in a rail for a heavy load freight railroad adversely affects toughness.

Next, in order to clarify the influence of the Pb content on the toughness, the inventors produced a plurality of rail steels with varying Pb contents and investigated the relationship between the Pb content and the toughness. The chemical composition of the rail used in this investigation, manufacturing conditions, and toughness evaluation test conditions are as described below.

[Alloying Elements of Rail Steel]
Base element of steel
(1) 0.75% of C-0.60% of Si-0.60% of Mn-0.0150% of P-0.0120% of S
(2) 1.00% of C-0.60% of Si-0.60% of Mn-0.0150% of P-0.0120% of S
(3) 1.20% of C-0.60% of Si-0.60% of Mn-0.0150% of P-0.0120% of S
Pb content: 0% to 0.0080%
[Manufacturing Conditions of Rail Steel]
Hot rolling conditions
Reheating temperature: 1250° C., Final rolling temperature: 1000° C.
Heat treatment conditions after hot rolling
Cooling rate: 3° C./sec to 10° C./sec, Cooling start temperature: 800° C., Cooling stop temperature: 580° C.
[Basic Properties of Rail Steel]
Metallographic structure of the head surface portion of the rail: pearlite (area ratio of 95% or more)
Hardness at the head surface portion of the rail: Hv 350 to Hv 400
[Evaluation Test of Toughness]
Test method: impact test
Test piece: JIS No. 3, 2 mm U-notch
Test piece taking position: 2 mm below the outer surface of the head portion of the rail (see FIG. 6, a notch position is 4 mm below the outer surface of the head portion of the rail)
Test temperature: room temperature (+20° C.)

FIG. 1 shows the results of the impact test. The horizontal axis indicates the Pb content, and the vertical axis indicates the impact value. As a result, it was confirmed that the impact value in the rail steel in any case of the carbon contents is greatly improved by reducing the Pb content. In particular, it became obvious that by controlling the Pb content to 0.0020% or less, the impact value is dramatically improved.

Pb in an amount of about 0.0030% is typically regarded as an impurity that does not affect the rail properties. In the related art, the relationship between Pb in an amount of about 0.0020% and toughness has not been hitherto examined.

According to the investigation by the inventors, a rail for heavy load freight railroads, in which molten steel is manufactured by an electric furnace method, typically contains about 30 ppm (0.0030%) of Pb. In addition, knowledge that the Pb content of the rail has to be reduced to 0.0030% or less has not been reported yet.

The experimental result shown in FIG. 1 shows that contrary to such technical common sense, a decrease in the Pb content to a trace amount as low as 0.0020% exhibits an extremely advantageous effect. In addition, it also became obvious from the experimental result shown in FIG. 1 that the impact value is further improved by controlling the Pb content to 0.0015% or less and further controlling the Pb content to 0.0010% or less.

This impact test is an evaluation test for confirming the toughness necessary for rail steel. As a result of analysis of the impact value of pearlite steel (0.75% to 1.20% of C) in the related art, it was confirmed that a rail confirmed to have an impact value of 10.0 $J/cm^2$ or more in this impact test has sufficient properties regarding toughness even in actual track. Therefore, here, the presence or absence of toughness securement was determined using an impact value of 10.0 $J/cm^2$ or more as an evaluation criterion.

Next, the inventors examined the minimum hardness necessary to secure the wear resistance of a rail primarily having a pearlite structure. Rails with varying hardnesses at the head portion of the rail were experimentally produced by performing hot rolling and heat treatments on hyper-eutectoid steel (1.00% of C-0.60% of Si-0.60% of Mn-0.0150% of P-0.0120% of S) under various conditions, and the relationship between the hardness and the wear resistance at the head portion of the rail was investigated. Wear resistance was evaluated by conducting a wear test on a test piece taken from the head portion of the rail. As a result, it was confirmed that in order to secure the wear resistance at the head portion of the rail containing 0.0005% to 0.0020% of Pb, it is necessary to control the hardness of a metallographic structure primarily including a pearlite structure present in a region from an outer surface of the head portion to a depth of 20 mm to a range of Hv 300 to Hv 500.

Figure 2:
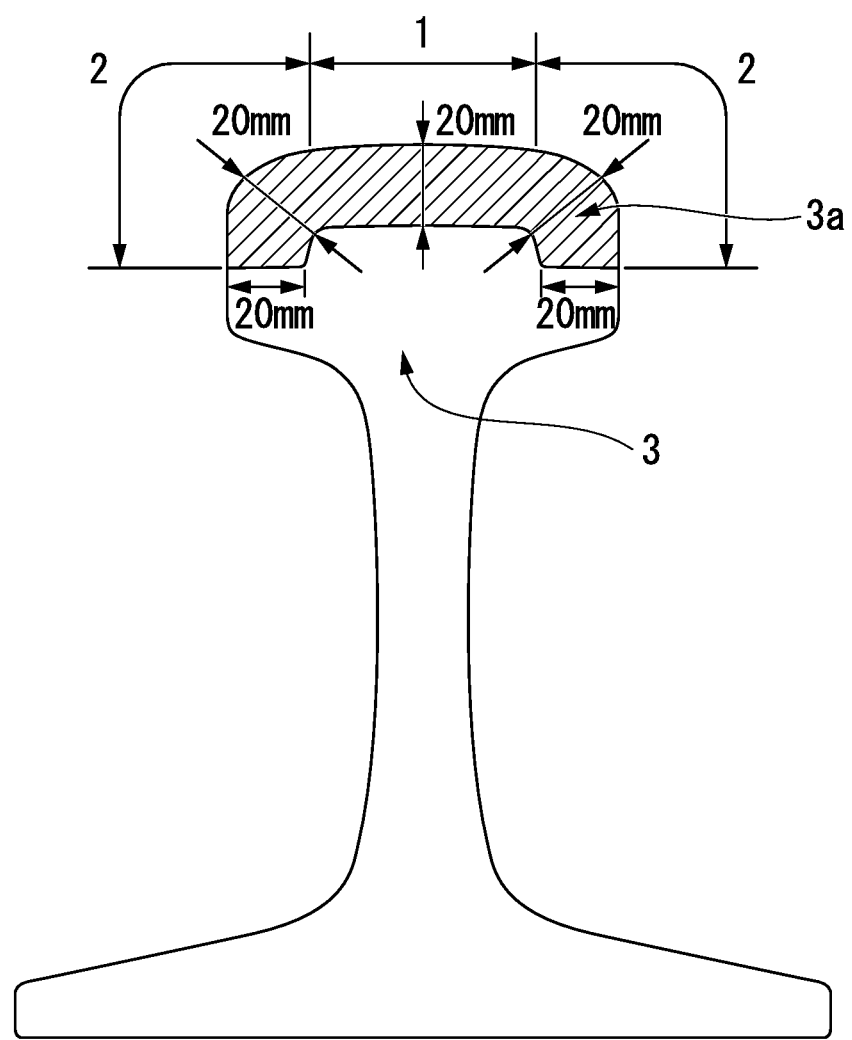
FIG. 2 is a view showing a configuration of the rail and a region including 95 area % or more of a pearlite structure.

As shown in FIG. 2, a head portion of the rail 3 is a portion above a constricted portion at the center in a height direction of the rail when the rail is viewed in a cross-section. The outer surface of the head portion is a region including a top head portion 1 and corner head portions 2 in the head portion of the rail 3. The top head portion 1 is a top surface of the head portion of the rail 3 when the rail is caused to stand upright. The corner head portions 2 are surfaces constituted by corners on both sides of the top head portion 1 and the upper half of the side surface of the head portion of the rail 3 when the rail is caused to stand upright.

One of the corner head portions 2 is a gauge corner (G.C.) portion which mainly comes into contact with a wheel. A region from the outer surface of the head portion to a depth of 20 mm is referred to as a head surface portion (head surface portion 3a hatched in FIG. 2).

The rail according to the embodiment which is excellent in wear resistance and toughness obtained based on the above knowledge will be described below in detail. Hereinafter, the unit "mass %" for amounts of alloying elements is simply described as "%".

First, the reasons for limiting the chemical composition of the rail of the embodiment will be described in detail.

(1) Reasons for Limiting Chemical Composition of Steel

The reasons for limiting the chemical composition of steel in the rail of the embodiment will be described in detail.

C is an element effective for promoting the pearlitic transformation and securing the wear resistance of the rail. When the C content is less than 0.75%, a pro-eutectoid ferrite structure is formed in the chemical composition, so that the minimum strength and wear resistance required for the rail primarily including the pearlite structure cannot be maintained. Therefore, the C content was limited to 0.75% or more. On the other hand, if the C content exceeds 1.20%, a pro-eutectoid cementite structure tends to be formed, and the wear resistance of the pearlite structure is decreased. Therefore, the C content was limited to 1.20% or less.

In order to stabilize the formation of the pearlite structure, it is desirable to set the C content to 0.80% or more. The lower limit of the C content may be set to 0.79%, 0.82%, or 0.85%. On the other hand, in order to reliably suppress the formation of a structure other than the pearlite structure, it is preferable to set the C content to 1.15% or less. The upper limit of the C content may be set to 1.18%.

Si is an element that is solid-soluted in the ferrite of the pearlite structure, increases the hardness at the head portion of the rail, and thus improves the wear resistance of the rail. However, in a case where the Si content is less than 0.10%, these effects cannot be obtained sufficiently. Therefore, the Si content was limited to 0.10% or more. On the other hand, when the Si content exceeds 2.00%, many surface defects are generated on the rail during hot rolling of the rail. Furthermore, when the Si content exceeds 2.00%, the hardenability of the rail is increased significantly, a martensite structure is formed in the head portion of the rail, and thus the wear resistance of the rail is decreased. Therefore, the Si content was limited to 2.00% or less.

In order to stabilize the formation of the pearlite structure and to improve the wear resistance of the rail, it is desirable to set the Si content to 0.20% or more. The lower limit of the Si content may be set to 0.25%, 0.45%, or 0.60%. On the other hand, in order to reliably suppress the formation of a structure other than the pearlite structure, it is preferable to set the Si content to 1.05% or less. The upper limit of the Si content may be set to 1.50%.

Mn is an element that stabilizes the pearlitic transformation by improving the hardenability of the rail, and simultaneously secures the hardness of the pearlite structure by refining the lamellar spacing of the pearlite structure, thereby further improving the wear resistance of the rail. However, when the Mn content is less than 0.10%, the effect is small, and a soft pro-eutectoid ferrite structure is formed, so that the wear resistance of the rail is decreased. Therefore, the Mn content was limited to 0.10% or more. On the other hand, when the Mn content exceeds 2.00%, the hardenability of the rail is increased significantly, and a bainite structure, a martensite structure, and the like are formed in the head portion of the rail, so that the wear resistance of the rail is decreased. Therefore, the Mn content was limited to 2.00% or less.

In order to stabilize the formation of the pearlite structure and to improve the wear resistance of the rail, it is desirable to set the Mn content to 0.20% or more. The lower limit of the Mn content may be set to 0.40%, 0.60%, or 0.75%. On the other hand, in order to reliably suppress the formation of a structure other than the pearlite structure, it is preferable to set the Mn content to 1.15% or less. The upper limit of the Mn content may be set to 1.50%.

P is an impurity element contained in steel. In a case where scrap is used as a raw material of molten steel, the P content is relatively small. In a case where the P content is large, it is possible to control the P content by removing slag generated by the melting in the electric furnace and thereafter blowing oxygen and the like for dephosphorization. When the P content exceeds 0.0250%, the pearlite structure becomes brittle, the ductility of a plastic deformation region of the rail is decreased, and exfoliation occurs on a wear surface, so that the wear resistance of the rail is decreased. When the P content exceeds 0.0250%, the toughness of the rail is decreased due to embrittlement of the pearlite structure. Therefore, the P content was limited to 0.0250% or less. The P content may be set to 0.0180% or less, 0.0150% or less, or 0.0130% or less.

The lower limit of the amount of P, which is an element that is not necessary for the rail according to the embodiment, is 0%. However, in consideration of the dephosphorization capability of a refining process, the lower limit of the P content may be set to about 0.0020% or 0.0030%.

S is an impurity element contained in steel. In a case where scrap is used as a raw material of molten steel, the content thereof is relatively small. In a case where the content is large, it is possible to control the S content by performing desulfurization in a ladle refining process after melting in the electric furnace. When the S content exceeds 0.0250%, inclusions of coarse MnS-based sulfides tend to be formed, and coarse voids caused by stress concentration in a plastic deformation region of the head portion of the rail due to contact between the rail and the wheel are generated, so that exfoliation on the wear surface occurs and the wear resistance is decreased. When the S content exceeds 0.0250%, stress concentration occurs around the inclusions of coarse MnS-based sulfides, so that the toughness of the rails is decreased. Therefore, the S content was limited to 0.0250% or less. The S content may be set to 0.0170% or less, 0.0150% or less, or 0.0140% or less.

The lower limit of the amount of S, which is an element that is not necessary for the rail according to the embodiment, is 0%. However, in consideration of the desulfurization capability of the refining process, the lower limit of the S content may be set to about 0.0020% or 0.0030%.

Pb is an impurity element contained in steel. As described above, Pb in an amount of about 0.0030% is regarded as an impurity that does not affect the rail properties typically, and is not particularly regarded as an object to be controlled in the related art. According to the investigation by the inventors, a rail for heavy load freight railroads typically contains about 30 ppm (0.0030%) of Pb. However, the inventors have found that when the Pb content exceeds 0.0020%, the toughness of the pearlite structure is greatly decreased. Even at an amount of Pb in a level that is typically considered to be an impurity, Pb greatly decreases the toughness of the rail. On the other hand, as will be described later, a Pb content of 0.0020% or less is acceptable as long as the metallographic structure and hardness at the head surface portion of the rail are appropriately controlled. Therefore, in order to make the toughness of the rail higher than that of a rail in the related art, the Pb content was limited to 0.0020% or less.

On the other hand, an excessive decrease in the Pb content leads to an increase in rail manufacturing costs. Therefore, in the rail according to the embodiment, the Pb content is set to 0.0003% or more.

In order to stably improve the toughness of the rail by controlling the Pb content, it is desirable to control the Pb content to 0.0015% or less. Furthermore, in order to further improve the toughness of the rail, it is desirable to control the Pb content to 0.0013% or less or 0.0010% or less. On the other hand, in order to further reduce the refining cost, the lower limit of the Pb content may be set to 0.0005%, 0.0007%, or 0.0010%.

Furthermore, for the purpose of improving wear resistance and internal fatigue damage resistance due to an increase in the hardness of the pearlite structure, improving toughness, preventing softening of a welded heat-affected zone, and controlling a cross-sectional hardness distribution in a head portion, the rail manufactured with the above-mentioned composition may contain one group or two or more groups of one or two of Cr and Mo in group a, Co in group b, B in group c, one or two of Cu and Ni in group d, one element or two or more elements of V, Nb, and Ti in group e, one element or two or more elements of Mg, Ca, and REM in group f, Zr in group g, Al in group h, and N in group i as necessary.

However, since the rail according to the embodiment can exhibit its effect even of these elements are not contained, the lower limit of the amounts of the elements in the group a to the group i is 0%.

Cr and Mo in the group a refine the lamellar spacing of the pearlite structure by increasing an equilibrium transformation point and thus improve the hardness of the rail.

Co in the group b refines the lamellar structure immediately under a rolling surface of the rail by being solid-soluted in the ferrite of the pearlite structure, thereby increasing the hardness of the wear surface.

B in the group c reduces the cooling rate dependence of a pearlitic transformation temperature and makes the hardness distribution at the head portion of the rail uniform.

Cu and Ni in the group d increase the hardness of the rail by being solid-soluted in ferrite of the pearlite structure, thereby improving the toughness of the pearlite structure.

V, Nb, and Ti in the group e improve the fatigue strength of the pearlite structure through precipitation hardening of carbides and nitrides generated during the hot rolling of the rail and subsequent cooling of the rail. V, Nb, and Ti in the group e stably generate carbides and nitrides during reheating the rail and prevent softening of a welded joint heat-affected zone.

Mg, Ca, and REM in the group f cause fine dispersion of MnS-based sulfides and thus reduce internal fatigue damage generated from inclusions.

Zr in the group g suppresses the formation of a segregation band of a cast piece center portion by increasing the equiaxed crystal ratio of a solidification structure, thereby suppressing the formation of a pro-eutectoid cementite structure and a martensite structure.

Al in the group h suppresses the formation of the pro-eutectoid cementite structure by moving the eutectoid transformation temperature to a high temperature side, thereby improving the wear resistance of the pearlite structure.

N in the group i promotes pearlitic transformation by segregating at austenite grain boundaries and thus improves the toughness of the rail. Furthermore, N in the group i promotes the precipitation of carbides and nitrides of V during the subsequent cooling process after hot rolling, thereby improving the fatigue resistance of the pearlite structure.

<Group a>

Cr is an element which refines the lamellar spacing of the pearlite structure by increasing the equilibrium transformation temperature and increasing the degree of supercooling, thereby improving the hardness of the pearlite structure and improving the wear resistance of the rail. In order to obtain the above-described effect, it is preferable to set the Cr content to 0.10% or more. On the other hand, in a case where the Cr content exceeds 2.00%, the hardenability of the rail is increased significantly, the bainite structure or the martensite structure are formed in the head portion of the rail, and there may be cases where the wear resistance of the rail is decreased. Therefore, it is preferable to set the Cr content to 2.00% or less.

In order to stabilize the formation of the pearlite structure and to improve the wear resistance of the rail, it is more preferable to set the Cr content to 0.20% or more. On the other hand, in order to prevent excessive formation of a structure other than the pearlite structure, the Cr content may be set to 1.00% or less, 0.80% or less, or 0.60% or less.

Mo is an element which refines the lamellar spacing of the pearlite structure by increasing the equilibrium transformation temperature and increasing the degree of supercooling, thereby improving the hardness of the pearlite structure and improving the wear resistance of the rail. In order to obtain the above-described effect, it is preferable to set the Mo content to 0.01% or more. On the other hand, in a case where the Mo content exceeds 0.50%, the transformation rate significantly is decreased, the martensite structure is formed in the head portion of the rail, and there may be cases where the wear resistance of the rail is decreased. Therefore, the Mo content may be 0.50% or less, 0.20% or less, or 0.10% or less.

<Group b>

Co is an element which refines the lamellar structure of the pearlite structure immediately under the rolling surface subjected to contact deformation with wheels by being solid-soluted in the ferrite of the pearlite structure, thereby improving the hardness of the rolling surface and improving the wear resistance of the rail. In order to obtain the above-described effect, it is preferable to set the Co content to 0.01% or more. On the other hand, when the Co content exceeds 1.00%, the effect described above is saturated and refinement of the lamellar structure in response to the Co content cannot be achieved. In addition, when the Co content exceeds 1.00%, economic efficiency is decreased due to an increase in alloy costs. Therefore, the Co content may be set to 1.00% or less, 0.50% or less, or 0.30% or less.

<Group c>

B is an element which forms iron boron carbide ($Fe_{23}(CB)_6$) at the austenite grain boundaries and thus reduces the cooling rate dependence of the pearlitic transformation temperature by a pearlitic transformation promoting effect, thereby making the hardness distribution from the head surface (the outer surface of the head portion) of the rail to the inside uniform and increasing the life of the rail. In order to obtain the above-described effect, it is preferable to set the B content to 0.0001% or more.

On the other hand, when the B content exceeds 0.0050%, coarse cubic boron carbide is formed, which promotes brittle fracture and may lower the toughness of the rail in some cases. Therefore, the B content may be set to 0.0050% or less, 0.0030% or less, or 0.0020% or less.

<Group d>

Cu is an element which is solid-soluted in the ferrite of the pearlite structure and thus improves the hardness of the rail through solid solution strengthening, thereby improving the wear resistance of the rail. In order to obtain the above-described effect, it is preferable to set the Cu content to 0.01% or more. On the other hand, when the Cu content exceeds 1.00%, due to a significant improvement in the hardenability of the rail, the martensite structure is formed in the head portion of the rail and there may be cases where the wear resistance of the rail is decreased. Therefore, it is preferable to set the Cu content to 1.00% or less.

In order to secure the hardness at the head portion of the rail and to suppress the formation of the martensite structure which is likely to be formed in a segregated portion or the like, the Cu content may be set to 0.30% or less, 0.20% or less, or 0.15% or less.

Ni is an element which improves the toughness of the pearlite structure and simultaneously improves the hardness of the rail through solid solution strengthening, thereby improving the wear resistance of the rail. Furthermore, in the welded heat-affected zone, Ni is an element which is bonded to Ti to precipitate as a fine intermetallic compound ($Ni_3Ti$), and thus suppresses softening of the rail through precipitation strengthening. In addition, in a case where Cu is contained in the rail, Ni suppresses embrittlement at grain boundaries.

In order to obtain the above-described effect, it is preferable to set the Ni content to 0.01% or more. When the Ni content exceeds 1.00%, the martensite structure is formed in the head portion of the rail due to a significant improvement in the hardenability of the rail, and there may be cases where the wear resistance of the rail is decreased. Therefore, the Ni content may be set to 1.00% or less, 0.50% or less, or 0.30% or less.

<Group e>

V is an element which increases the hardness (strength) of the pearlite structure through precipitation hardening by carbides and nitrides of V generated during the cooling process after hot rolling, and thus improves the fatigue damage resistance inside the head portion of the rail. In order to obtain the above-described effect, it is preferable to set the V content to 0.01% or more. On the other hand, when the V content exceeds 0.50%, the number of fine carbides and nitrides of V becomes excessive, the pearlite structure becomes brittle, and there may be cases where the fatigue damage resistance of the rail may be decreased. Therefore, the V content may be set to 0.50% or less, 0.20% or less, or 0.10% or less.

Nb is an element which increases the hardness of the pearlite structure through precipitation hardening by Nb carbides and Nb nitrides generated during the cooling process after hot rolling, and thus improves the fatigue damage resistance inside the head portion of the rail. Furthermore, in the heat-affected zone reheated to a temperature range of the Ac1 point or less, Nb is an element effective in stably producing Nb carbides and Nb nitrides from a low temperature range to a high temperature range and preventing softening of the heat-affected zone of a welded joint.

In order to obtain the above-described effect, it is preferable to set the Nb content to 0.0010% or more. On the other hand, if the Nb content exceeds 0.0500%, precipitation hardening of carbides and nitrides of Nb becomes excessive, the pearlite structure itself becomes brittle, and there may be cases where the fatigue damage resistance of the rail is decreased. Therefore, the Nb content may be set to 0.0500% or less, 0.0200% or less, or 0.0100% or less.

Ti is an element which increases the hardness of the pearlite structure through precipitation hardening by Ti carbides and Ti nitrides generated during the cooling process after hot rolling, and thus improves the fatigue damage resistance inside the head portion of the rail. In addition, Ti is an element which is effective in refining the structure of the heat-affected zone heated to an austenite range using the fact that Ti carbides and Ti nitrides precipitated during reheating at the time of welding do not dissolve in a matrix, and thus preventing embrittlement of the welded joint portion.

In order to obtain the above-described effect, it is preferable to set the Ti content to 0.0030% or more. On the other hand, when the Ti content exceeds 0.0500%, coarse Ti carbides and Ti nitrides are generated, stress concentration around them causes fatigue cracking to easily occur, and there may be cases where the fatigue damage resistance of the rail is decreased. Therefore, the Ti content may be set to 0.0500% or less, 0.0200% or less, or 0.0100% or less.

<Group f>

Mg is an element which is bonded to S to form fine sulfide (MgS), the MgS causes fine dispersion of MnS and relaxes stress concentration around MnS, thereby improving the fatigue damage resistance of the rail. In order to obtain the above-described effect, it is preferable to set the Mg content to 0.0005% or more.

On the other hand, in a case where the Mg content exceeds 0.0200%, coarse Mg oxides are generated, stress concentration around the coarse oxides causes fatigue cracking to easily occur, and there may be cases where the fatigue damage resistance of the rail is decreased. Therefore, the Mg content may be set to 0.0200% or less, 0.0080% or less, or 0.0030% or less.

Ca has a strong bonding force to S and thus forms sulfide (CaS), the CaS causes fine dispersion of MnS and relaxes stress concentration around MnS, thereby improving the fatigue damage resistance of the rail. In order to obtain the above-described effect, it is preferable to set the Ca content to 0.0005% or more.

On the other hand, in a case where the Ca content exceeds 0.0200%, coarse Ca oxides are generated, stress concentration around the coarse oxides causes fatigue cracking to easily occur, and there may be cases where the fatigue damage resistance of the rail is decreased. Therefore, the Ca content may be set to 0.0200% or less, 0.0100% or less, or 0.0050% or less.

REM is a deoxidizing and desulfurizing element, and generates oxysulfide of REM ($REM_2O_2S$), which becomes a nucleus for generating Mn sulfide-based inclusions such as MnS. Oxysulfide ($REM_2O_2S$) has a high melting point, and thus suppresses elongation of the Mn sulfide-based inclusions after hot rolling. As a result, REM causes fine dispersion of the Mn sulfide-based inclusions, relaxes stress concentration around the Mn sulfide-based inclusions, and thus improves the fatigue damage resistance of the rail. In order to obtain the above-described effect, it is preferable to set the REM content to 0.0005% or more.

On the other hand, when the REM content exceeds 0.0500%, oxysulfide of REM ($REM_2O_2S$), which is coarse and hard, is generated, stress concentration around the oxysulfide causes fatigue cracking to easily occur, and there may be cases where the fatigue damage resistance of the rail is decreased. Therefore, the REM content may be set to 0.0500% or less, 0.0200% or less, or 0.0100% or less.

REM is a rare earth metal such as Ce, La, Pr, or Nd. The "REM content" means the total value of the amounts of all REM elements. As long as the total content is within the above range, the same effect can be obtained even if the number of kinds of the REM elements is one or two or more.

<Group g>

Zr is an element which forms $ZrO_2$ inclusions having good lattice matching with γ-Fe, and thus γ-Fe becomes a solidification nucleus of high carbon rail steel, which is a solidification primary phase, and thus increases the equiaxed crystal ratio of the solidification structure, thereby suppressing the formation of a segregation band of a cast piece center portion and suppressing the formation of the martensite structure formed in a rail segregated portion. In order to obtain the above-described effect, it is preferable to set the Zr content to 0.0001% or more.

On the other hand, when the Zr content exceeds 0.0200%, a large amount of coarse Zr-based inclusions are generated, stress concentration around the coarse inclusions causes fatigue cracking to easily occur, and there may be cases where the fatigue damage resistance of the rail is decreased. Therefore, the Zr content may be set to 0.0200% or less, 0.0100% or less, or 0.0050% or less.

<Group h>

Al is an element that functions as a deoxidizing material. In addition, Al is an element which increases the eutectoid transformation temperature, suppresses the formation of the pro-eutectoid cementite structure, and thus improves the wear resistance of the pearlite structure. In order to obtain the above-described effect, it is preferable to set the Al content to 0.0050% or more.

On the other hand, when the Al content exceeds 1.0000%, it is difficult for Al to being solid-soluted in steel, and coarse alumina-based inclusions are generated, so that fatigue cracking from the coarse inclusions is likely to occur and there may be cases where the fatigue damage resistance of the rail is decreased. Furthermore, when the Al content exceeds 1.0000%, oxides are generated during rail welding, and there may be cases where the rail weldability significantly is decreased. Therefore, the Al content may be set to 1.0000% or less, 0.0500% or less, or 0.0200% or less.

<Group i>

N is an element effective in promoting the pearlitic transformation from the austenite grain boundaries by segregating at the austenite grain boundaries and primarily refining the pearlite block size, thereby improving the toughness of the rail. In addition, when N and V are simultaneously contained, precipitation of carbonitride of V is promoted during the cooling process after the hot rolling of the rail, the hardness of the pearlite structure is increased, and the fatigue resistance of the rail is improved. In order to obtain the above-described effect, it is preferable to set the N content to be 0.0050% or more.

On the other hand, when the N content exceeds 0.0200%, it becomes difficult for N to be solid-soluted in steel, and there may be cases where bubbles serving as the origin of fatigue damage are likely to be generated. Therefore, the N content may be set to 0.0200% or less, 0.0150% or less, or 0.0100% or less.

Among the above-mentioned elements, there may be cases where Cu, Ni, Cr, and Mo are incorporated from raw material scrap when steel is industrially manufactured in an electric furnace. Even in this case, as long as the chemical compositions of Cu, Ni, Cr, and Mo are within the above-described ranges, the properties of the rail according to the embodiment are not impaired.

The remainder of the chemical composition of the rail according to the embodiment contains Fe and impurities. Here, the impurities mean those incorporated from the raw material scrap, a manufacturing environment, or the like when steel is manufactured in an electric furnace. The impurities may be contained within a range that does not adversely affect the properties of the rail according to the embodiment.

(2) Reasons for Limiting Necessary Region of Metallographic Structure and Pearlite Structure Next, in the rail according to the present embodiment, the reason that 95% (area ratio) or more of the region (head surface portion) from the outer surface of the head portion to a depth of 20 mm is set to a pearlite structure will be described in detail.

First, the reason that the amount of the pearlite structure is set to 95 area % or more will be described.

The most important thing for the head portion of the rail which comes into contact with the wheel is to secure wear resistance. As a result of an investigation into the relationship between the metallographic structure and the wear resistance, it was confirmed that the pearlite structure most improves the wear resistance of the rail. In addition, the pearlite structure has sufficient hardness even with a small amount of alloying elements. Here, for the purpose of improving the wear resistance of the rail, in consideration of a decrease in cross-section due to wear, the structure at the portion of contact with the wheel was limited to 95 area % or more of the pearlite structure.

Next, the reason that the necessary region of the metallographic structure (the structure including the pearlite structure) in which the pearlite structure is included at a ratio of 95% or more by area ratio is limited to a region from the outer surface of the head portion to a depth of at least 20 mm will be described.

In a case where a region including 95 area % or more of the pearlite structure is less than 20 mm from the outer surface of the head portion, the region is too small to secure the wear resistance required for the head portion of the rail, and furthermore, it becomes difficult to secure a sufficient rail service life. In addition, in order to further improve the wear resistance of the rail, it is desirable that a structure of a region from the outer surface of the head portion to a depth of about 30 mm is set to a structure including 95 area % or more of the pearlite structure.

As described above, the region from the outer surface of the head portion to the depth of 20 mm, which is a region including the corner head portions 2 and the top head portion 1, is called a head surface portion (3a, hatched portion). As long as the structure containing 95 area % or more of the pearlite structure having a predetermined hardness is disposed in the head surface portion 3a from the surfaces of the corner head portions 2 and the top head portion 1 to the depth of 20 mm, it is possible to secure the wear resistance of the rail.

Therefore, it is desirable that the structure including 95 area % or more of the pearlite structure is disposed in the head surface portion 3a which is a portion that mainly comes into contact with the wheel and is required to have wear resistance, and other portions which do not need wear resistance may have the pearlite structure in an area ratio of less than 95 area %.

In addition, it is desirable that the metallographic structure of the head surface portion 3a of the rail of the embodiment is a structure including 95 area % or more of the pearlite structure as defined above. However, depending on the chemical composition of the rail and a heat treatment in manufacturing method, into the structure, pro-eutectoid ferrite, pro-eutectoid cementite, a bainite structure, and a martensite structure may be incorporated in a trace amount of less than 5% by area ratio in addition to the pearlite structure.

However, even if these structures are incorporated, the wear resistance of the head portion surface is not greatly adversely affected. Therefore, the structure of the head surface portion 3a of the rail of the embodiment may include the pro-eutectoid ferrite, the pro-eutectoid cementite, the bainite structure, and the martensite structure in a trace amount of less than 5 area %. In other words, the metallographic structure of the head surface portion 3a of the rail of the embodiment may have a pearlite structure in an area ratio of 95% or more, and in order to sufficiently secure the wear resistance of the rail, it is desirable that 98 area % or more of the metallographic structure of the head surface portion 3a by area ratio is the pearlite structure.

Measurement of the area ratio of the pearlite structure of the head surface portion 3a can be performed by observing 10 or more visual fields in the metallographic structure of a cross-section in a region from the outer surface of the head portion to a depth of at least 20 mm with an optical microscope at a magnification of 200 times, and calculating the average value of the area ratios of the pearlite structure in each of the visual fields.

(3) Reasons for Limiting Hardness of Structure Including Pearlite Structure

Next, in the embodiment, the reason that the hardness of the structure including the pearlite structure in the head surface portion 3a is limited to a range of Hv 300 to Hv 500 will be described. When the hardness of the structure including the pearlite structure in the head surface portion 3a is less than Hv 300, the wear of the rail proceeds and it becomes difficult to secure the wear resistance required for the rail.

In addition, when the hardness of the pearlite structure in the head surface portion 3a exceeds Hv 500, minute cracks easily occur on the outer surface of the head portion which comes into contact with the wheel due to the embrittlement of the structure including the pearlite structure, and it becomes difficult to secure the surface damage resistance of the rail.

Therefore, the hardness of the structure including the pearlite structure in the head surface portion 3a was limited to the range of Hv 300 to Hv 500. Since portions other than the head surface portion 3a do not come into contact with the rail and are not required to have wear resistance, the hardness of the structure of the portions other than the head surface portion 3a is not particularly limited.

For example, it is determined that the rail in which the hardnesses of the rail at a position of a depth of 2 mm and at a position of a depth of 20 mm from the outer surface of the head portion are in the above-described range is a rail which satisfies the above-described requirements regarding the hardness at the head surface portion 3a. In addition, the measurement of the hardness of the rail at each of the measurement positions is desirably performed by measuring 10 or more points of the Vickers hardness under a load of, for example, 98 N, at each of the measurement position of a depth of 2 mm from the outer surface of the head portion and the measurement position of a depth of 20 mm from the outer surface of the head portion, and calculating the average value thereof.

This is because, in the head surface portion 3a of the rail according to the embodiment, although 95% or more by area ratio is occupied by the pearlite structure, since the other structures (the pro-eutectoid cementite, the pro-eutectoid ferrite, the martensite structure, the bainite structure, and the like) are present in a range of less than 5 area % in some cases, there may be cases where measurement of a single point cannot represent the hardness of the structure including the pearlite structure.

(4) Reasons for Limiting Average Number Density of Pb Oxide-Based Inclusion Having Grain Size of 1.0 μm to 5.0 μm Next, the reason that it is preferable to cause the average number density of Pb oxide-based inclusions having an equivalent circle diameter (grain size) of 1.0 μm to 5.0 μm to be 100 pieces/1000 μm$^2$ in a cross-section (that is, a cross-section perpendicular to a longitudinal direction of the rail) at a position of a depth of 2 mm to 20 mm from the outer surface of the head portion in the rail according to the embodiment will be described.

Pb oxide is normally present as inclusions consisting only of Pb oxide in steel or as inclusions consisting of Pb oxide and other alloying elements adhered to the periphery thereof.

In the embodiment, these inclusions are referred to as "Pb oxide-based inclusions", the equivalent circle diameter is referred to as "grain size", and Pb oxide-based inclusions having a grain size of 1.0 μm to 5.0 μm are referred to as "coarse Pb oxide-based inclusion" in some cases.

First, in order to further stably improve the toughness of the rail steel, the inventors examined the control of Pb oxide-based inclusions generated in the pearlite structure. In a ladle refining process, pearlite steel was manufactured by adjusting the amounts of powdered coke and lime, controlling the amount of oxygen, and changing the size and number of Pb oxide-based inclusions, and the toughness thereof was evaluated by an impact test.

As a result, it became obvious that pearlite steel with a high impact value and pearlite steel with a low impact value exist in the same Pb content.

Therefore, in order to effectively improve the impact value, the inventors conducted a detailed investigation into a fracture origin of the pearlite steel having a decreased impact value. As a result, it was found that a large amount of Pb oxide-based inclusions having a grain size in a range of 1.0 μm to 5.0 μm are present at the fracture origin. The inventors have found that fracture is promoted by stress concentration on coarse Pb oxide-based inclusions.

Furthermore, in order to clarify the influence of the amount of coarse Pb oxide-based inclusions, the inventors melted steel with varying Pb contents for a test in a laboratory, conducted an experiment that simulates stirring of molten steel with an inert gas by controlling the amount of oxygen, manufactured pearlite steels in which the number density of coarse Pb oxide-based inclusions was changed by controlling a molten steel stirring time and a molten steel killing time after the stirring treatment, and evaluated toughness.

[Alloying Elements of Rail Steel]
Base element of steel
1.00% of C-0.60% of Si-0.60% of Mn-0.0150% of P-0.0120% of S
Pb content: changed within a range of 0.0003% to 0.0020%
[Manufacturing Conditions of Rail Steel]
Treatment in the ladle refining process
Molten steel stirring time with inert gas: 0.5 minutes to 4 minutes
Molten steel standing time after the stirring treatment: 10 minutes to 40 minutes
Hot rolling conditions
Reheating temperature: 1250° C., Final rolling temperature: 1000° C.
Heat treatment conditions
Cooling rate: 6° C./sec, Cooling start temperature: 800° C., Stop temperature: 580° C.
[Basic Properties of Rail Steel]
Metallographic structure of the head surface portion of the rail: pearlite (area ratio of 95% or more)
Hardness at the head surface portion of the rail: Hv 400 to Hv 420
Average number density of coarse Pb oxides per unit area: 10 pieces/1000 μm$^2$ to 200 pieces/1000 μm$^2$

Figure 3:
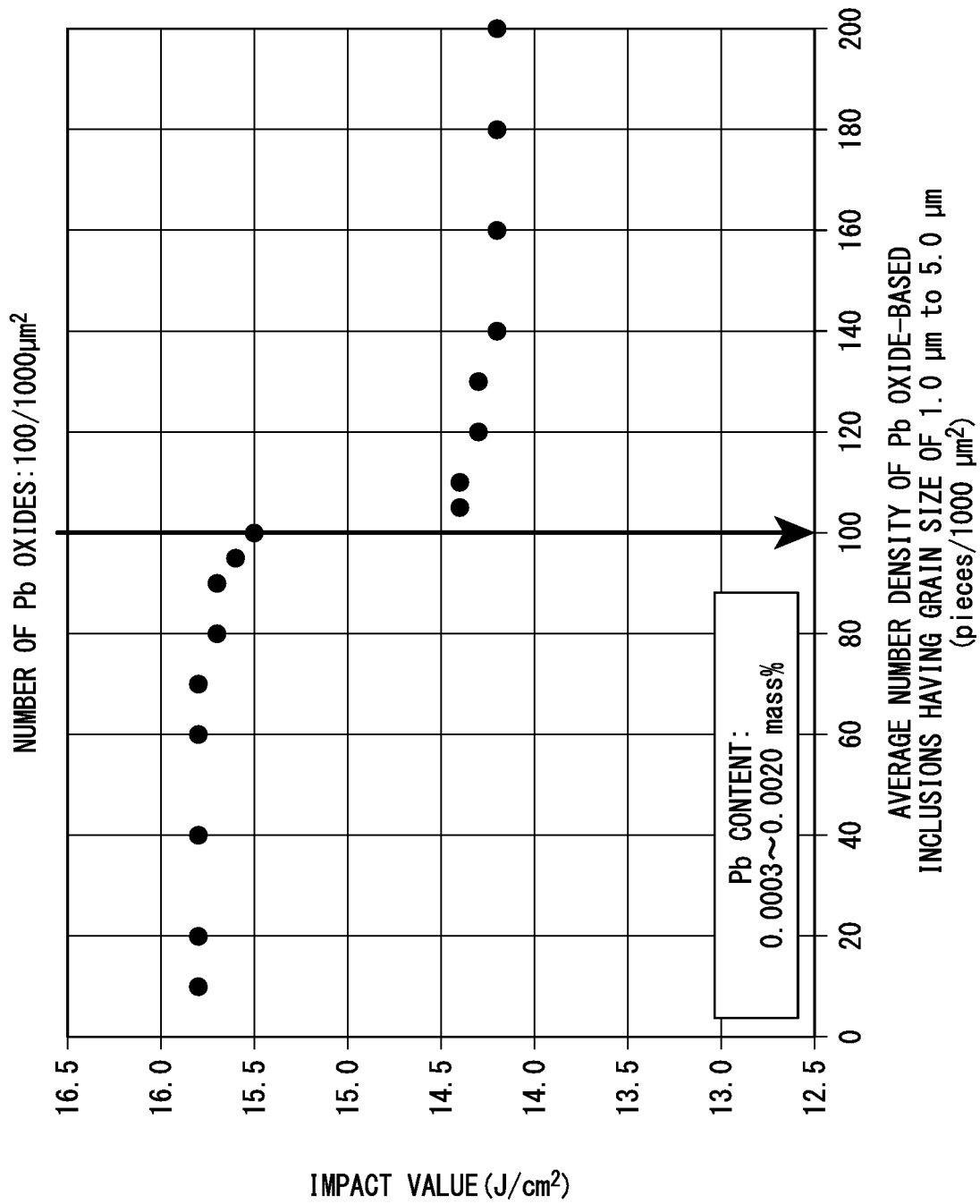
FIG. 3 is a graph showing the relationship between the average number density (pieces/1000 $\mu m^2$) of Pb oxide-based inclusions having a grain size of 1.0 $\mu m$ to 5.0 $\mu m$ and the impact value of the rail.

[Measurement Method of Grain Size and Average Number Density of Pb Oxide-Based Inclusions]
Pretreatment: diamond grinding of the cross-section of the rail
Apparatus: scanning electron microscope
Magnification: 1000 to 2000
Preliminary analysis: Composite inclusions of Pb and O are identified by performing elemental analysis with an electron beam microanalyzer.
Measurement position: observed in a visual field centered on a depth of 5 mm from the outer surface of the head portion as the origin.
Grain size range of Pb oxide-based inclusions as an evaluation object: 1.0 μm to 5.0 μm
Measurement of grain size: Only Pb oxide-based inclusions were selected, the area thereof was calculated, and the grain size was calculated using by the diameter of the circle corresponding to the area.
Calculation of average number density of coarse Pb oxide-based inclusions: 20 visual fields were observed, the number of coarse Pb oxide-based inclusions was counted and converted into a number per 1000 μm$^2$, and the average value thereof was obtained.
[Evaluation Test of Toughness]
Test method: impact test
Test piece: JIS No. 3, 2 mm U-notch
Test piece taking position: 2 mm below an outer surface of a head portion of the rail (see FIG. 6, a notch position is 4 mm below)
Test temperature: room temperature (+20° C.)
FIG. 3 shows the results of the impact test. In the graph shown in FIG. 3, the horizontal axis represents the average number density (pieces/1000 μm$^2$) of coarse Pb oxide-based inclusions, and the vertical axis represents the impact value. As shown in the graph of FIG. 3, it was confirmed that the impact value greatly varies depending on the average number density of coarse Pb oxide-based inclusions.

Specifically, it became obvious that when the average number density of coarse Pb oxide-based inclusions per unit area is 100 pieces/1000 μm$^2$ or less, stress concentration is relaxed and the impact value is further improved. Therefore, in the rail according to the embodiment, it is preferable that the average number density of coarse Pb oxide-based inclusions per unit area is 100 pieces/1000 μm$^2$ or less. The upper limit of the average number density of coarse Pb oxide-based inclusions per unit area is more preferably 90 pieces/1000 μm$^2$, 70 pieces/1000 μm$^2$, or 50 pieces/1000 μm$^2$.

Pb oxide-based inclusions tend to pile up at the center portion of a steel piece during casting. In a case where the Pb content is small, there may be cases where coarse Pb oxide-based inclusions are not present in the vicinity of the outer surface of the head portion where the presence thereof is confirmed. Therefore, the lower limit of the average number density of coarse Pb oxide-based inclusions is not particularly defined, and may be set to 0 pieces/1000 μm$^2$. On the other hand, in a case where the oxide is present, the lower limit of the average number density of coarse Pb oxide-based inclusions may be set to 1 pieces/1000 μm$^2$ or more.

The position where the number density of coarse Pb oxide-based inclusions is controlled is set to be in a region from the outer surface of the head portion of the rail to a depth of 2 mm to 20 mm. In a case of considering a decrease in the area of the cross-section due to wear during use, a region from the outer surface of the head portion to a depth of less than 2 mm does not become a necessary region for toughness required of the rail itself. For the above reasons, the region from the outer surface of the head portion to the depth of less than 2 mm is not regarded as a control object of the number density of coarse Pb oxide-based inclusions.

The reason for limiting the grain size of the Pb oxide-based inclusions as an object of number control to the range of 1.0 µm to 5.0 µm is that as a result of observation of the fracture origin portion of the rail steel as described above, Pb oxide-based inclusions having a grain size of 1.0 µm to 5.0 µm are present at the origin portion. This is because the Pb oxide-based inclusions in this grain size range cause stress concentration and cause a decrease in impact value.

In addition, in steel, Pb oxide-based inclusions having a grain size of less than 1.0 µm (fine Pb oxide-based inclusions) and Pb oxide-based inclusions having a grain size of more than 5.0 µm (ultra-coarse Pb oxide-based inclusions) may be present. However, it was found that the fine Pb oxide-based inclusions cause low stress concentration in the vicinity thereof and do not greatly affect the impact value.

In addition, it was found that although the ultra-coarse Pb oxide-based inclusions cause high stress concentration in the vicinity thereof, since the number thereof is small, the ultra-coarse Pb oxide-based inclusions do not substantially act as the origin of fracture and are meaningless as an evaluation object. Therefore, the number densities of the fine Pb oxide-based inclusions and the ultra-coarse Pb oxide-based inclusions are not specified.

(5) Manufacturing Method of Rail of Embodiment

Rail steel manufactured by melting steel using an electric furnace is typically manufactured by the following means. First, scrap is melted in the electric furnace to produce molten steel, slag generated in the molten steel in the electric furnace is removed, and thereafter oxygen or the like is blown into the molten steel for dephosphorization. Furthermore, in a ladle refining furnace (LF), powdered coke, lime, and the like are added to the molten steel to generate reducing slag, and deoxidation and desulfurization are carried out to produce steel.

In addition, in order to prevent incorporation of impurities in an amount that cannot be removed by typical refining, screening of scrap before melting the scrap may be performed in some cases. In addition, as necessary, the amounts of hydrogen, oxygen, and nitrogen in the molten steel are controlled by a vacuum degassing device.

The produced molten steel is formed into a cast piece by an ingot-making and blooming method or a continuous casting method, and then hot rolling is performed on the cast piece, thereby manufacturing a rail. Furthermore, as necessary, for the purpose of controlling the metallographic structure and hardness at the head portion of the rail, a heat treatment is performed on the rail after the hot rolling.

In the manufacturing method of the rail of the embodiment, control of the amount of alloys in the molten steel, deoxidation, desulfurization, and the like are performed in the ladle refining furnace (LF). Furthermore, particularly in the manufacturing method of the rail of the embodiment, as necessary, control of the amount of oxygen is performed in the vacuum degassing process. Furthermore, particularly in the manufacturing method of the rail of the embodiment, by controlling the molten steel stirring time using the inert gas in the ladle refining process and the molten steel killing time, the average number density of coarse Pb oxide-based inclusions is controlled, the molten steel is cast to produce a bloom or slab, and the bloom or slab is subjected to hot rolling to be formed into a rail shape. Furthermore, as necessary, for the purpose of controlling the metallographic structure of the head portion of the rail and controlling the hardness, the heat treatment is performed after the hot rolling.

(5-1) Refining Conditions (Control of Pb Content)

First, a control method of the Pb content will be described. In the manufacturing method of the rail according to the embodiment, in order to control the Pb content, it is desirable to control the amount of oxygen in the ladle refining furnace (LF) after producing the molten steel in the electric furnace. The amount of oxygen in the molten steel is measured in advance, and the amounts of powdered coke, lime, and the like to be added as a deoxidizing material are controlled based on the amount of oxygen in the molten steel to cause a slight amount of oxygen to remain in the molten steel.

Furthermore, as necessary, the amount of residual oxygen is controlled by the vacuum degassing device. Utilizing the residual oxygen, Pb oxide is generated from Pb, and it is necessary to completely discharge the oxide from the steel and reduce the Pb content in the molten steel.

(5-2) Conditions of Molten Steel Stirring and Molten Steel Killing (Control of Average Number Density of Coarse Pb Oxide-Based Inclusions)

Next, a method of controlling the average number density of coarse Pb oxide-based inclusions will be described. As described above, in the rail according to the embodiment, it is desirable that the average number density of coarse Pb oxide-based inclusions in the cross-section at a position of a depth of 2 mm to 20 mm from the outer surface of the head portion is 100 pieces/1000 µm$^2$.

In order to control the number density of the coarse Pb oxide-based inclusions in this manner, in the manufacturing method of the rail according to the embodiment, the molten steel stirring time using the inert gas in the ladle refining process, and the molten steel killing time after the stirring treatment need to be in predetermined ranges.

Specifically, when the molten steel is stirred with the inert gas in the ladle refining process, the reaction between the residual oxygen and Pb is promoted, so that Pb oxide-based inclusions are generated. Furthermore, the stirring of the molten steel using the inert gas has effects of promoting agglomeration of the Pb oxide-based inclusions in the molten steel and promoting floating and removal of the Pb oxide-based inclusions. Therefore, in order to control the average number density of the coarse Pb oxide-based inclusions, it is desirable to set the stirring time of the molten steel to 2.0 minutes or longer.

However, stirring for a long period of time causes an increase in the viscosity of the molten steel due to a decrease in the molten steel temperature and deterioration in the floating properties of the Pb oxide-based inclusions. Therefore, in a case of controlling the average number density of the coarse Pb oxide-based inclusions, the stirring time is preferably set to be in a range of 2.0 minutes to 4.0 minutes.

In addition, it is necessary to cause the molten steel to kill after sufficiently stirring the molten steel using the inert gas in the ladle refining process for floating and separation of the Pb oxide-based inclusions generated in the molten steel. In order to promote the floating and separation of the Pb oxide-based inclusions, it is preferable to cause the molten steel after being stirred using the inert gas to kill for 30.0 minutes or longer.

However, even if the standing time is extremely lengthened, the temperature of the molten steel decreases, and the viscosity of the molten steel increases, resulting in the deterioration of the floating properties of the Pb oxide-based inclusions and saturation of the floating and separation effect. Therefore, in a case of controlling the average number density of the coarse Pb oxide-based inclusions, the molten steel killing time is preferably set to be in a range of 30.0 minutes to 40.0 minutes.

Therefore, in order to cause the average number density of the coarse Pb oxide-based inclusions to be a predetermined value, it is preferable that the stirring time of the molten steel is set to 2.0 minutes to 4.0 minutes and the killing time of the molten steel is set to 30.0 minutes to 40.0 minutes.

(5-3) Hot Rolling Conditions

Regarding the hot rolling conditions, in order to maintain the pearlite structure and to control the hardness at the head portion of the rail, ranges described below are set.

First, hot rolling conditions will be described.

First, the reheating temperature of the bloom or slab will be described. When the reheating temperature of the bloom or slab is lower than 1000° C., hot formative properties cannot be secured during the rolling of the rail, rolling defects are generated, and it becomes difficult to manufacture the rail. In addition, depending on the carbon content and the alloy content of the steel, the melting point is decreased. Therefore, when the reheating temperature exceeds 1400° C., the steel may be melted and it becomes difficult to manufacture the rail in some cases. Therefore, the reheating temperature of the bloom or slab is in a range of 1000° C. to 1400° C.

Next, a final rolling temperature will be described.

When the final rolling temperature is lower than 750° C., pearlitic transformation starts immediately after the rolling. Therefore, the hardness of the rail cannot be increased in the heat treatment after the end of the rolling, and the wear resistance cannot be secured. In addition, when the final rolling temperature exceeds 1100° C., the austenite grains after the rolling become coarse, the hardenability is greatly increased, and a bainite structure harmful to the wear resistance is generated in the head portion of the rail. In this case, the wear resistance of the rail is decreased and the minimum ductility necessary for the rail cannot be secured. Therefore, the final rolling temperature is in a range of 750° C. to 1100° C.

Other hot rolling conditions are not particularly limited. In order to secure the hardness at the head portion of the rail, caliber rolling of a normal rail may be performed while controlling the reheating temperature and the final rolling temperature of the bloom or slab as described above. For example, after rough rolling of the bloom or slab, intermediate rolling is performed by a reverse rolling mill over a plurality of passes, subsequently finish rolling is performed by a continuous rolling mill for two or more passes, and during final rolling of the finish rolling, the final rolling temperature may be controlled to be in the above temperature range.

(5-4) Heat Treatment Conditions

Steel to which a rail shape is imparted by hot rolling is subjected to a heat treatment through natural cooling or accelerated cooling in order to maintain the pearlite structure and to control the hardness at the head portion of the rail (particularly the head surface portion). The heat treatment is carried out in the ranges of conditions described below.

First, the cooling rate will be described. When the cooling rate is less than 1° C./sec, the pearlitic transformation temperature is increased, so that the hardness of the rail cannot be increased, and the wear resistance of the rail cannot be secured. When the cooling rate exceeds 20° C./sec, a bainite structure and a martensite structure are formed in the head portion of the rail in the chemical composition, and the wear resistance of the rail is decreased. Therefore, the cooling rate is set to be in a range of 1° C./sec to 20° C./sec.

Next, a cooling start temperature will be described. When the cooling start temperature is lower than 700° C. in the chemical composition, the pearlite structure is formed in a high temperature range before accelerated cooling, so the hardness of the rail cannot be increased, and the wear resistance of the rail cannot be secured. In a case where the cooling start temperature is lower than 700° C., a pro-eutectoid cementite structure is formed, and the wear resistance of the rail may be decreased in some cases. When the start temperature exceeds 900° C., the hardenability of the rail is greatly increased, a bainite structure harmful to the wear resistance is formed in the head portion of the rail, and the wear resistance is decreased. Therefore, the cooling start temperature is set to be in a range of 700° C. to 900° C.

Next, a cooling stop temperature will be described. When the cooling stop temperature exceeds 650° C., in the chemical composition, pearlitic transformation starts in a high temperature range immediately after cooling, so that a large amount of the pearlite structure with low hardness are formed. As a result, the hardness at the head portion of the rail cannot be secured, and it becomes difficult to secure the wear resistance necessary for the rail. When accelerated cooling is performed to less than 500° C., in the chemical composition, a large amount of the bainite structure harmful to the wear resistance are formed immediately after the stop of the cooling. As a result, it becomes difficult to secure the wear resistance necessary for the rail. Therefore, the cooling stop temperature is set to be in a range of 500° C. to 650° C.

The kind of a refrigerant for the heat treatment of the rail is not particularly limited. In order to control the hardness of the rail to impart wear resistance to the rail, the cooling rate of the rail during the heat treatment is controlled as described above by air injection cooling, mist cooling, mixed injection cooling of water and air, or a combination thereof. In a case where the cooling rate of the rail falls within the above range, the rail after the hot rolling may be allowed to cool naturally to room temperature. In this case, the cooling start temperature and the cooling stop temperature specified as described above can be ignored.

EXAMPLES

Next, examples of the present invention will be described. In Example 1, the influence of the chemical composition and the manufacturing method on the configuration and properties of the rail was investigated, and in Example 2, the effect when the rail of the present invention is manufactured using commercially available scrap as a raw material was investigated.

Example 1

Tables 1-1 to 1-4 show the chemical compositions and various properties of the rail of the present invention, and Tables 2-1 and 2-2 show the chemical compositions and various properties of comparative rails. In these tables, the chemical composition values, the microstructure of the head surface portion, the hardness at the head surface portion, and the average number density of Pb oxide-based inclusions (coarse Pb oxide-based inclusions) having a grain size of 1.0 µm to 5.0 µm are shown. Values outside the specified ranges of the present invention are underlined. Furthermore, the results of a wear test conducted by the method shown in FIG.

4 are also shown and the results of an impact test. In Tables 1-1 to 2-2 and Tables 3-1 to 4-2, which will described later, a sample with a micro structure described as "P" represents that the amount of pearlite (P) was 95 area % or more, a sample described as "P+F" represents that the amount of pearlite was less than 95 area % and the remainder included pro-eutectoid ferrite (F), a sample described as "P+B+M" represents that the amount of pearlite was less than 95 area % and the remainder included bainite (B) and martensite (M), and a sample described as "P+C" represents that the amount of pearlite was less than 95 area % and the remainder included pro-eutectoid cementite (C). In Tables 1-1 to 3-2, a sample in which the average number density (unit: pieces/1000 $\mu m^2$) of coarse Pb oxide-based inclusions is described as "exceeded" represents that the average number density of coarse Pb oxide-based inclusions exceeds 100 pieces/1000 $\mu m^2$.

The outline of manufacturing processes and manufacturing conditions of examples of the present invention and comparative examples shown in Tables 1-1 to 2-2 are as follows.

Overall process

Blooms or slabs were manufactured by melting scrap and the like in an electric furnace while adjusting the chemical compositions (ladle refining) and then performing casting. These blooms or slabs were reheated, then subjected to hot rolling, and further subjected to further a heat treatment, thereby manufacturing examples of the present invention and comparative examples.

As the raw material of the examples of the present invention and the comparative examples, scrap (referred to as in-house scrap or high-grade scrap) generated in a production stage of the manufacturing industry, such as cut plates, punching wastes, cutting wastes, and cutting chips, scrap made of a Pb-coated steel plate, and an ingot for controlling alloying elements were used. This is because it is necessary to accurately control the amounts of the alloying elements in order to investigate the influence of Pb on the properties of the rail. High-grade scrap and the Pb-coated steel sheet slightly vary in the amounts of the alloying elements and are thus suitable for controlling the amounts of the alloying elements in the rail.

The outline of the manufacturing conditions of the examples of the present invention and the comparative examples are as follows.

Hot rolling conditions

Reheating temperature: 1000° C. to 1400° C., Final rolling temperature: 750° C. to 1100° C.

Heat treatment (cooling) conditions after hot rolling

Cooling rate: 1° C./sec to 20° C./sec, Cooling start temperature: 700° C. to 900° C., Cooling stop temperature: 500° C. to 650° C.

In the table, "natural cooling" means that the rail after the hot rolling has been left to room temperature, "heat treatment" means that forced cooling using the cooling means (air injection cooling, mist cooling, mixed injection cooling of water and air, or a combination thereof) is performed on the rail after the hot rolling from the cooling start temperature (start temperature) to the cooling stop temperature (stop temperature).

Furthermore, in order to control the average number density of coarse Pb oxide-based inclusions, the composition of the molten steel was adjusted under the following conditions.

Treatment in the ladle refining process

Molten steel stirring time using inert gas: 0.5 minutes to 4.0 minutes

Molten steel killing time after the stirring treatment: 10.0 minutes to 40.0 minutes In Tables 3-1 and 3-2, detailed manufacturing conditions of some of the rails of the present invention are described. In addition, the chemical compositions C1 to C5 are the same as those of the steels with symbols for the examples described in "Steel composition No" in Tables 3-1 and 3-2. By further optimizing the manufacturing conditions, it becomes possible to control the average number density of coarse Pb oxide-based inclusions, and it is possible to further improve the toughness.

Details of the rails of the examples of the present invention and the comparative examples shown in Tables 1-1 to 2-2 are as follows.

(1) Rails of the Present Invention (51 Rails)

Invention Examples A1 to A51

Rails in which the chemical composition value, the microstructure of the head surface portion, and the hardness at the head surface portion are within the ranges of the present invention.

Invention Examples A1 to A10, A12, A14, A16, A17, A19, A21, A23, A25, A27, A28, A29, A30, A31, A32, A34, A36, A38, A40, A42, A44, A46, A48, A50

Rails in which the chemical composition value, the microstructure of the head surface portion, and the hardness at the head surface portion are within the ranges of the present invention.

Invention Examples A11, A13, A15, A18, A20, A22, A24, A26, A33, A35, A37, A39, A41, A43, A45, A47, A49, A51

Rails in which the chemical composition value, the microstructure of the head surface portion, and the hardness at the head surface portion are within the ranges of the present invention, and the average number density of coarse Pb oxide-based inclusions is preferably controlled.

(2) Comparative Rails (14 Rails)

Comparative Examples B1 to B14 (14 Rails)

Rails in which one or more of the chemical composition value, the microstructure of the head surface portion, and the hardness at the head surface portion are outside the ranges of the present invention.

Comparative Examples B1 to B8 (8 Rails)

Rails in which the C content, the Si content, the Mn content, the P content or the S content are outside the range of the present invention.

Comparative Examples B9 to B14 (6 Rails)

Rails in which the Pb content is outside the range of the present invention.

[Identification Method of Microstructure of Head Surface Portion of Rail]

Measurement of the area ratio of the pearlite structure of the head surface portion of the rail was performed by observing 10 or more visual fields in the metallographic structure of a cross-section at each of a position of a depth of 2 mm and a position of a depth of 20 mm from the outer surface of the head portion with an optical microscope at a magnification of 200 times, and calculating the average value of the area ratios of the pearlite structures at each of the position of the depth of 2 mm and the position of depth of 20 mm. In a case where the area ratio of the pearlite structure at both the position of the depth of 2 mm and the position of the depth of 20 mm is 95% or more, the area ratio of the pearlite structure in the entire head surface portion was regarded as being 95% or more, and pass was determined regarding the microstructure of the head surface portion of the rail.

[Measurement Method of Hardness at Head Surface Portion of Rail]

Measuring device: Vickers hardness tester (load 98 N)

Taking test piece for measurement: cut out a sample from cross-section of the head surface portion of the rail Pretreatment: The cross-section was polished with diamond abrasive grains with a grain size of 1 μm.

Measurement method: measured according to JIS Z 2244

Calculation of Hardness 2 mm below the outer surface of the head portion: The hardness was measured for 20 points at a position of a depth of 2 mm from the outer surface of the head portion in the cross-section of the head surface portion shown in FIG. 2, and the average value of the hardnesses obtained as described above was determined as the hardness at the corresponding position.

20 mm below the outer surface of the head portion: The hardness was measured for 20 points at a position of a depth of 20 mm from the outer surface of the head portion in the cross-section of the head surface portion shown in FIG. 2, and the average value of the hardnesses obtained as described above was determined as the hardness at the corresponding position.

Determination of pass or fail of the hardness at the head surface portion: In a case where both the hardnesses at the position of the depth of 2 mm below the outer surface of the head portion and the position of the depth of 20 mm below the outer surface of the head portion were within the range of the present invention, pass is determined regarding the hardness at the head surface portion.

[Measurement Method of Grain Size and Average Number Density of Pb Oxide-Based Inclusions]

Pretreatment: diamond grinding of the cross-section of the rail

Apparatus: scanning electron microscope

Magnification: 1000 times to 2000 times

Preliminary analysis: Composite inclusions of Pb and O are identified by performing elemental analysis with an electron beam microanalyzer.

Measurement position: observed in a visual field centered on a depth of 5 mm from the outer surface of the head portion as the origin.

Grain size range of Pb oxide-based inclusions as an evaluation object: 1.0 μm to 5.0 μm Measurement of grain size: Only Pb oxide-based inclusions were selected, the area thereof was calculated, and the grain size was calculated using by the diameter of the circle corresponding to the area.

Calculation of average number density of coarse Pb oxide-based inclusions: 20 visual fields were observed, the number of coarse Pb oxide-based inclusions was counted and converted into a number per 1000 μm$^2$, and the average value thereof was obtained.

[Wear Test]

Figure 4:
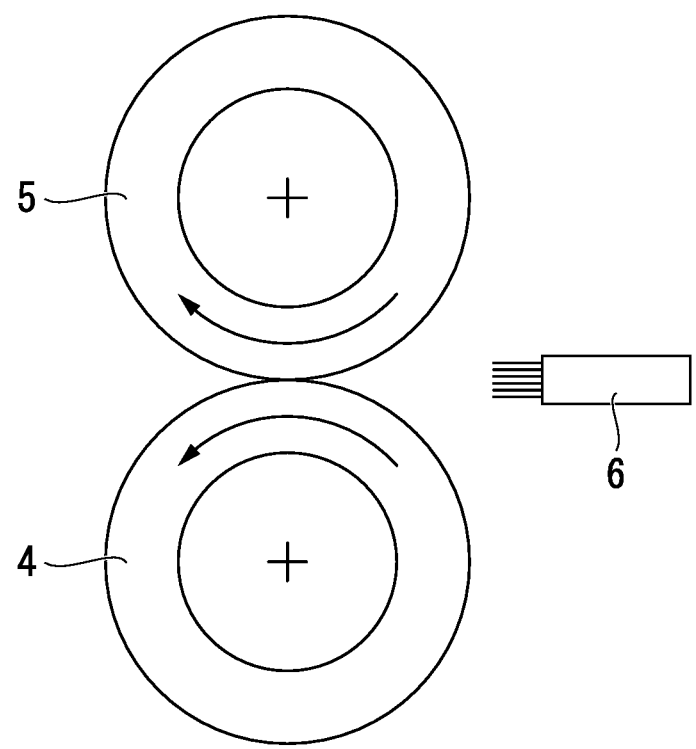
FIG. 4 is a diagram showing an outline of a wear test.

Testing machine: Nishihara type wear testing machine (see FIG. 4)

Test piece shape (rail specimen 4): disk-shaped test piece (outer diameter: 30 mm, thickness: 8 mm)

Figure 5:
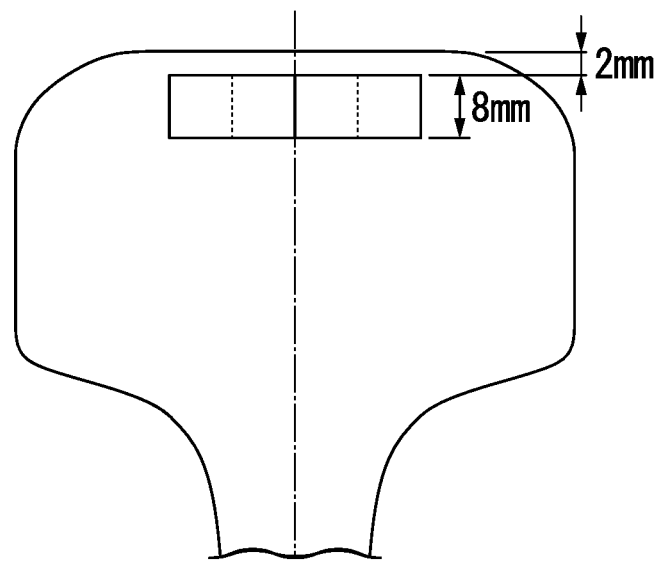
FIG. 5 is a view showing a wear test piece taking position.

Test piece taking position: a position corresponding to 2 mm below the outer surface of the head portion (head portion surface, see FIG. 5)

Test load: 686 N (contact surface pressure 640 MPa)

Slip ratio: 20%

Counter material (wheel specimen 5): pearlite steel (Hv 380)

Atmosphere: in the air

Cooling: forced cooling by compressed air injection (flow rate: 100 Nl/min) from a cooling air nozzle 6, number of repetitions: 700,000 times

[Impact Test]

Testing machine: impact testing machine

Test piece shape: JIS No. 3, 2 mm U-notch

Figure 6:
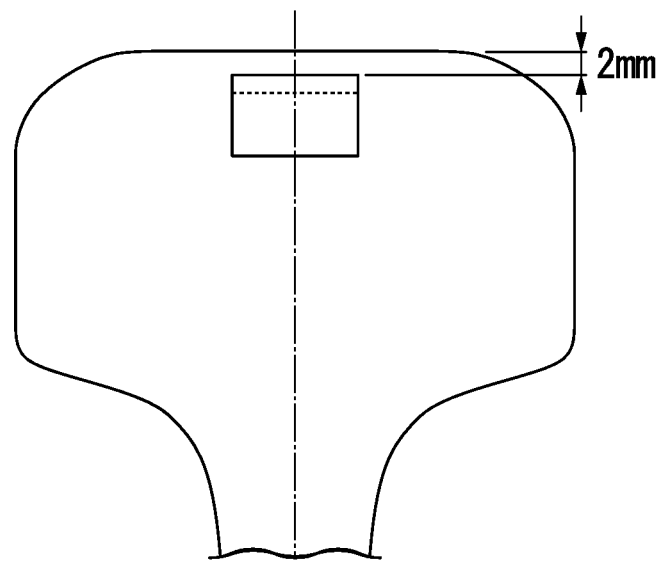
FIG. 6 is a view showing an impact test piece taking position.

Test piece taking position: a position corresponding to 2 mm below the outer surface of the head portion of the rail (see FIG. 6, 4 mm below notch position)

Test temperature: room temperature (20° C.)

TABLE 1-1

| | | Chemical composition (mass %) (remainder: Fe and impurities) | | | | | | Notices regarding manufacturing |
| --- | --- | --- | --- | --- | --- | --- | --- | --- | --- |
| | No. | C | Si | Mn | P | S | Pb | Others | method after hot rolling |
| Invention | A1 | 0.75 | 0.25 | 0.80 | 0.0120 | 0.0110 | 0.0010 | — | Natural cooling |
| Example | A2 | 1.20 | 0.25 | 0.80 | 0.0120 | 0.0110 | 0.0010 | — | Heat treatment |
| | A3 | 0.80 | 0.10 | 0.60 | 0.0180 | 0.0150 | 0.0007 | — | Natural cooling |
| | A4 | 0.80 | 2.00 | 0.60 | 0.0180 | 0.0150 | 0.0007 | — | Heat treatment |
| | A5 | 1.00 | 0.40 | 0.10 | 0.0150 | 0.0080 | 0.0003 | — | Heat treatment |
| | A6 | 1.00 | 0.40 | 2.00 | 0.0150 | 0.0080 | 0.0003 | — | Heat treatment |
| | A7 | 0.95 | 0.50 | 1.00 | 0.0250 | 0.0100 | 0.0005 | — | Heat treatment |
| | A8 | 0.95 | 0.50 | 1.00 | 0.0150 | 0.0250 | 0.0005 | — | Heat treatment |
| | A9 | 1.00 | 0.80 | 0.65 | 0.0250 | 0.0100 | 0.0020 | — | Heat treatment |
| | A10 | 0.80 | 0.40 | 0.75 | 0.0120 | 0.0100 | 0.0007 | Cr: 0.25, Ca: 0.0025 | Heat treatment |
| | A11 | 0.80 | 0.40 | 0.75 | 0.0120 | 0.0100 | 0.0007 | Cr: 0.25, Ca: 0.0025 | Heat treatment |
| | A12 | 0.85 | 1.05 | 0.80 | 0.0160 | 0.0130 | 0.0013 | REM: 0.0025 | Heat treatment |
| | A13 | 0.85 | 1.05 | 0.80 | 0.0160 | 0.0130 | 0.0013 | REM: 0.0025 | Heat treatment |
| | A14 | 0.90 | 0.50 | 0.90 | 0.0120 | 0.0100 | 0.0020 | Co: 0.15, Nb: 0.0025 | Heat treatment |
| | A15 | 0.90 | 0.50 | 0.90 | 0.0120 | 0.0100 | 0.0020 | Co: 0.15, Nb: 0.0025 | Heat treatment |
| | A16 | 0.92 | 0.35 | 1.10 | 0.0105 | 0.0100 | 0.0003 | Cu: 0.30 | Heat treatment |
| | A17 | 0.92 | 0.35 | 1.10 | 0.0105 | 0.0100 | 0.0003 | Cu: 0.15 | Heat treatment |
| | A18 | 0.92 | 0.35 | 1.10 | 0.0105 | 0.0100 | 0.0003 | Cu: 0.15 | Heat treatment |

TABLE 1-1-continued

| | No. | Chemical composition (mass %) (remainder: Fe and impurities) | | | | | | Notices regarding manufacturing method after hot rolling |
|---|---|---|---|---|---|---|---|---|---|
| | | C | Si | Mn | P | S | Pb | Others | |
| | A19 | 0.94 | 0.50 | 0.70 | 0.0120 | 0.0080 | 0.0016 | V: 0.06, Mg: 0.0025 | Heat treatment |
| | A20 | 0.94 | 0.50 | 0.70 | 0.0120 | 0.0080 | 0.0016 | V: 0.06, Mg: 0.0025 | Heat treatment |
| | A21 | 0.95 | 0.30 | 1.00 | 0.0140 | 0.0100 | 0.0009 | Nb: 0.0025, Ti: 0.0035 | Heat treatment |
| | A22 | 0.95 | 0.30 | 1.00 | 0.0140 | 0.0100 | 0.0009 | Nb: 0.0025, Ti: 0.0035 | Heat treatment |
| | A23 | 0.97 | 0.45 | 0.75 | 0.0130 | 0.0080 | 0.0013 | Mg: 0.0020, Ca: 0.0015 | Heat treatment |
| | A24 | 0.97 | 0.45 | 0.75 | 0.0130 | 0.0080 | 0.0013 | Mg: 0.0020, Ca: 0.0015 | Heat treatment |
| | A25 | 0.98 | 0.55 | 1.15 | 0.0130 | 0.0080 | 0.0011 | B: 0.0010, Al: 0.0080 | Heat treatment |

TABLE 1-2

| | No. | Chemical composition (mass %) (remainder: Fe and impurities) | | | | | | | Notices regarding manufacturing method after hot rolling |
|---|---|---|---|---|---|---|---|---|---|---|
| | | C | Si | Mn | P | S | Pb | Others | |
| Invention Example | A26 | 0.98 | 0.55 | 1.15 | 0.0130 | 0.0080 | 0.0011 | B: 0.0010, Al: 0.0080 | Heat treatment |
| | A27 | 1.00 | 0.70 | 1.00 | 0.0095 | 0.0050 | 0.0020 | — | Heat treatment |
| | A28 | 1.00 | 0.70 | 1.00 | 0.0095 | 0.0050 | 0.0017 | — | Heat treatment |
| | A29 | 1.00 | 0.70 | 1.00 | 0.0095 | 0.0050 | 0.0013 | — | Heat treatment |
| | A30 | 1.00 | 0.70 | 1.00 | 0.0095 | 0.0050 | 0.0010 | — | Heat treatment |
| | A31 | 1.00 | 0.70 | 1.00 | 0.0095 | 0.0050 | 0.0007 | — | Heat treatment |
| | A32 | 1.00 | 0.70 | 1.00 | 0.0095 | 0.0050 | 0.0003 | — | Heat treatment |
| | A33 | 1.00 | 0.70 | 1.00 | 0.0095 | 0.0050 | 0.0003 | — | Heat treatment |
| | A34 | 1.00 | 0.35 | 0.60 | 0.0030 | 0.0140 | 0.0009 | Cr: 0.45 | Heat treatment |
| | A35 | 1.00 | 0.35 | 0.60 | 0.0030 | 0.0140 | 0.0009 | Cr: 0.45 | Heat treatment |
| | A36 | 1.00 | 0.45 | 0.80 | 0.0160 | 0.0030 | 0.0014 | Mo: 0.02, Zr: 0.0010 | Heat treatment |
| | A37 | 1.00 | 0.45 | 0.80 | 0.0160 | 0.0030 | 0.0014 | Mo: 0.02, Zr: 0.0010 | Heat treatment |
| | A38 | 1.00 | 0.65 | 1.10 | 0.0080 | 0.0150 | 0.0010 | Ni: 0.10 | Heat treatment |
| | A39 | 1.00 | 0.65 | 1.10 | 0.0080 | 0.0150 | 0.0010 | Ni: 0.10 | Heat treatment |
| | A40 | 1.00 | 0.50 | 0.35 | 0.0080 | 0.0170 | 0.0013 | — | Heat treatment |
| | A41 | 1.00 | 0.50 | 0.35 | 0.0080 | 0.0170 | 0.0013 | — | Heat treatment |
| | A42 | 1.05 | 0.65 | 0.70 | 0.0200 | 0.0120 | 0.0008 | REM: 0.0025, Zr: 0.0010 | Heat treatment |
| | A43 | 1.05 | 0.65 | 0.70 | 0.0200 | 0.0120 | 0.0008 | REM: 0.0025, Zr: 0.0010 | Heat treatment |
| | A44 | 1.10 | 0.30 | 0.40 | 0.0180 | 0.0120 | 0.0018 | Al: 0.0080 | Heat treatment |
| | A45 | 1.10 | 0.30 | 0.40 | 0.0180 | 0.0120 | 0.0018 | Al: 0.0080 | Heat treatment |
| | A46 | 1.10 | 0.35 | 0.30 | 0.0120 | 0.0120 | 0.0010 | — | Heat treatment |
| | A47 | 1.10 | 0.35 | 0.30 | 0.0120 | 0.0120 | 0.0010 | — | Heat treatment |
| | A48 | 1.15 | 0.40 | 0.50 | 0.0150 | 0.0080 | 0.0014 | V: 0.05, N: 0.0070 | Heat treatment |
| | A49 | 1.15 | 0.40 | 0.50 | 0.0150 | 0.0080 | 0.0014 | V: 0.05, N: 0.0070 | Heat treatment |
| | A50 | 1.20 | 0.25 | 0.25 | 0.0090 | 0.0160 | 0.0006 | — | Heat treatment |
| | A51 | 1.20 | 0.25 | 0.25 | 0.0090 | 0.0160 | 0.0006 | — | Heat treatment |

TABLE 1-3

| | No. | Microstructure of head portion | | Hardness at head portion (Hv) | | Average number density of coarse Pb oxides (pieces/1000 μm$^2$) | Wear test result Wear amount (gf, 700,000 times) | Impact test result Impact value (J/cm$^2$) |
|---|---|---|---|---|---|---|---|---|
| | | 2 mm below head surface | 20 mm below head surface | 2 mm below head surface | 20 mm below head surface | | | |
| Invention Example | A1 | P | P | 355 | 300 | Exceeded | 1.150 | 16.8 |
| | A2 | P | P | 440 | 360 | Exceeded | 0.520 | 12.0 |
| | A3 | P | P | 340 | 310 | Exceeded | 1.050 | 16.3 |
| | A4 | P | P | 405 | 350 | Exceeded | 0.990 | 16.0 |
| | A5 | P | P | 405 | 360 | Exceeded | 0.690 | 15.0 |
| | A6 | P | P | 450 | 375 | Exceeded | 0.640 | 15.1 |
| | A7 | P | P | 440 | 390 | Exceeded | 0.730 | 15.3 |
| | A8 | P | P | 430 | 390 | Exceeded | 0.730 | 15.2 |
| | A9 | P | P | 450 | 370 | Exceeded | 0.630 | 13.2 |
| | A10 | P | P | 380 | 320 | Exceeded | 1.020 | 16.8 |
| | A11 | P | P | 380 | 320 | 10 | 1.020 | 18.0 |
| | A12 | P | P | 420 | 390 | Exceeded | 0.980 | 15.8 |
| | A13 | P | P | 420 | 390 | 46 | 0.980 | 17.2 |
| | A14 | P | P | 440 | 380 | Exceeded | 0.800 | 15.0 |
| | A15 | P | P | 440 | 380 | 100 | 0.800 | 16.2 |
| | A16 | P | P | 465 | 410 | Exceeded | 0.780 | 13.0 |

TABLE 1-3-continued

| | | Microstructure of head portion | | Hardness at head portion (Hv) | | Average number | Wear test result | Impact test result |
|---|---|---|---|---|---|---|---|---|
| | No. | 2 mm below head surface | 20 mm below head surface | 2 mm below head surface | 20 mm below head surface | density of coarse Pb oxides (pieces/1000 μm$^2$) | Wear amount (gf, 700,000 times) | Impact value (J/cm$^2$) |
| | A17 | P | P | 465 | 410 | Exceeded | 0.780 | 15.3 |
| | A18 | P | P | 465 | 410 | 2 | 0.780 | 16.6 |
| | A19 | P | P | 450 | 420 | Exceeded | 0.720 | 14.6 |
| | A20 | P | P | 450 | 420 | 82 | 0.720 | 16.1 |
| | A21 | P | P | 475 | 440 | Exceeded | 0.620 | 15.3 |
| | A22 | P | P | 475 | 440 | 17 | 0.620 | 16.6 |
| | A23 | P | P | 440 | 385 | Exceeded | 0.650 | 14.3 |
| | A24 | P | P | 440 | 380 | 42 | 0.650 | 16.0 |
| | A25 | P | P | 470 | 420 | Exceeded | 0.630 | 14.2 |

TABLE 1-4

| | | Microstructure of head portion | | Hardness at head portion (Hv) | | Average number | Wear test result | Impact test result |
|---|---|---|---|---|---|---|---|---|
| | No. | 2 mm below head surface | 20 mm below head surface | 2 mm below head surface | 20 mm below head surface | density of coarse Pb oxides (pieces/1000 μm$^2$) | Wear amount (gf, 700,000 times) | Impact value (J/cm$^2$) |
| Invention Example | A26 | P | P | 470 | 420 | 39 | 0.630 | 15.9 |
| | A27 | P | P | 475 | 425 | Exceeded | 0.610 | 13.5 |
| | A28 | P | P | 475 | 425 | Exceeded | 0.610 | 13.6 |
| | A29 | P | P | 475 | 425 | Exceeded | 0.610 | 14.2 |
| | A30 | P | P | 475 | 425 | Exceeded | 0.610 | 14.8 |
| | A31 | P | P | 475 | 425 | Exceeded | 0.610 | 15.0 |
| | A32 | P | P | 475 | 425 | Exceeded | 0.610 | 15.2 |
| | A33 | P | P | 475 | 425 | 3 | 0.610 | 16.5 |
| | A34 | P | P | 480 | 430 | Exceeded | 0.600 | 14.8 |
| | A35 | P | P | 480 | 430 | 28 | 0.600 | 16.2 |
| | A36 | P | P | 440 | 390 | Exceeded | 0.650 | 14.0 |
| | A37 | P | P | 440 | 390 | 43 | 0.650 | 15.6 |
| | A38 | P | P | 485 | 410 | Exceeded | 0.590 | 14.8 |
| | A39 | P | P | 485 | 410 | 34 | 0.590 | 16.3 |
| | A40 | P | P | 405 | 370 | Exceeded | 0.690 | 14.2 |
| | A41 | P | P | 405 | 370 | 40 | 0.690 | 15.8 |
| | A42 | P | P | 490 | 445 | Exceeded | 0.550 | 14.0 |
| | A43 | P | P | 490 | 445 | 27 | 0.550 | 15.3 |
| | A44 | P | P | 455 | 400 | Exceeded | 0.540 | 12.2 |
| | A45 | P | P | 455 | 400 | 88 | 0.540 | 13.8 |
| | A46 | P | P | 460 | 410 | Exceeded | 0.540 | 13.0 |
| | A47 | P | P | 460 | 410 | 33 | 0.540 | 14.3 |
| | A48 | P | P | 500 | 450 | Exceeded | 0.510 | 12.0 |
| | A49 | P | P | 500 | 450 | 56 | 0.510 | 13.6 |
| | A50 | P | P | 450 | 405 | Exceeded | 0.500 | 12.0 |
| | A51 | P | P | 450 | 405 | 10 | 0.500 | 13.2 |

TABLE 2-1

| | | Chemical composition (mass %) (remainder: Fe and impurities) | | | | | | | Notices regarding manufacturing method after hot rolling |
|---|---|---|---|---|---|---|---|---|---|
| | No. | C | Si | Mn | P | S | Pb | Others | |
| Comparative Example | B1 | <u>0.65</u> | 0.25 | 0.80 | 0.0120 | 0.0110 | 0.0010 | — | Natural cooling |
| | B2 | <u>1.30</u> | 0.25 | 0.80 | 0.0120 | 0.0110 | 0.0010 | — | Heat treatment |
| | B3 | 0.80 | <u>0.05</u> | 0.60 | 0.0180 | 0.0150 | 0.0007 | — | Natural cooling |
| | B4 | 0.80 | <u>2.40</u> | 0.60 | 0.0180 | 0.0150 | 0.0007 | — | Heat treatment |
| | B5 | 1.00 | 0.40 | <u>0.05</u> | 0.0150 | 0.0080 | 0.0003 | — | Heat treatment |
| | B6 | 1.00 | 0.40 | <u>2.50</u> | 0.0150 | 0.0080 | 0.0003 | — | Heat treatment |
| | B7 | 0.95 | 0.50 | 1.00 | <u>0.0350</u> | 0.0100 | 0.0005 | — | Heat treatment |
| | B8 | 0.95 | 0.50 | 1.00 | 0.0150 | <u>0.0300</u> | 0.0005 | — | Heat treatment |
| | B9 | 1.00 | 0.80 | 0.65 | 0.0250 | 0.0100 | <u>0.0028</u> | — | Heat treatment |
| | B10 | 0.90 | 0.50 | 0.90 | 0.0120 | 0.0100 | <u>0.0040</u> | Co: 0.15, Nb: 0.0025 | Heat treatment |
| | B11 | 1.00 | 0.70 | 1.00 | 0.0095 | 0.0050 | <u>0.0023</u> | — | Heat treatment |

TABLE 2-1-continued

| | Chemical composition (mass %) (remainder: Fe and impurities) | | | | | | | Notices regarding manufacturing method |
|---|---|---|---|---|---|---|---|---|
| No. | C | Si | Mn | P | S | Pb | Others | after hot rolling |
| B12 | 1.00 | 0.45 | 0.80 | 0.0160 | 0.0030 | 0.0050 | Mo: 0.02, Zr: 0.0010 | Heat treatment |
| B13 | 1.10 | 0.30 | 0.40 | 0.0180 | 0.0120 | 0.0043 | Al: 0.0080 | Heat treatment |
| B14 | 1.10 | 0.35 | 0.30 | 0.0120 | 0.0120 | 0.0021 | — | Heat treatment |

TABLE 2-2

| | No. | Microstructure of head portion | | Hardness at head portion (Hv) | | Average number density of coarse Pb oxides (pieces/ 1000 μm$^2$) | Wear test result Wear amount (gf, 700,000 times) | Impact test result Impact value (J/cm$^2$) |
|---|---|---|---|---|---|---|---|---|
| | | 2 mm below head surface | 20 mm below head surface | 2 mm below head surface | 20 mm below head surface | | | |
| Comparative Example | B1 | P + F | P + F | 330 | 280 | Exceeded | 1.450 (large wear due to formation of F) | 18.5 |
| | B2 | P + C | P + C | 440 | 375 | Exceeded | 1.300 (large wear due to formation of C) | 5.0 (low impact value due to formation of C) |
| | B3 | P | P | 290 | 260 | Exceeded | 1.650 (large wear due to decrease in hardness) | 18.0 |
| | B4 | P + M | P + M | 550 | 485 | Exceeded | 1.540 (large wear due to formation of M) | 6.0 (low impact value due to formation of M) |
| | B5 | P + F | P + F | 335 | 275 | Exceeded | 1.380 (large wear due to formation of F) | 15.5 |
| | B6 | P + B + M | P + B + M | 575 | 490 | Exceeded | 1.450 (large wear due to formation of M and B) | 5.5 (low impact value due to formation of M) |
| | B7 | P | P | 440 | 390 | Exceeded | 1.350 (large wear due to structure embrittlement) | 6.3 (low impact value due to structure embrittlement) |
| | B8 | P | P | 430 | 390 | Exceeded | 1.450 (large wear due to formation of coarse MnS) | 7.2 (low impact value due to formation of coarse MnS) |
| | B9 | P | P | 450 | 370 | Exceeded | 0.630 | 7.4 (low impact value due to large Pb content) |
| | B10 | P | P | 440 | 380 | Exceeded | 0.800 | 7.8 (low impact value due to large Pb content) |
| | B11 | P | P | 475 | 425 | Exceeded | 0.610 | 7.6 (low impact value due to large Pb content) |
| | B12 | P | P | 440 | 390 | Exceeded | 0.650 | 7.0 (low impact value due to large Pb content) |
| | B13 | P | P | 455 | 400 | Exceeded | 0.540 | 6.5 (low impact value due to large Pb content) |
| | B14 | P | P | 460 | 410 | Exceeded | 0.540 | 7.2 (low impact value due to large Pb content) |

TABLE 3-1

| | | Treatment of ladle refining process | | | | Heat treatment conditions | | |
|---|---|---|---|---|---|---|---|---|
| No. | Steel Composition No. | Molten steel stirring time (min) | Molten steel standing time after stirring treatment (min) | Heating Reheating temperature (° C.) | Hot rolling Final rolling temperature (° C.) | Start temperature (° C.) | Cooling rate (° C./sec) | Stop temperature (° C.) |
| C1 | A12 | 1.0 | 30.0 | 1180 | 710 | 800 | 4.0 | 580 |
| A12 | A12 | 1.0 | 30.0 | 1180 | 950 | 760 | 4.0 | 580 |
| A13 | A13 | 3.0 | 30.0 | 1180 | 950 | 760 | 4.0 | 580 |
| C2 | A21 | 2.5 | 10.0 | 1420 | 1020 | 900 | 12.0 | 570 |
| A21 | A21 | 2.5 | 10.0 | 1260 | 1020 | 800 | 12.0 | 570 |
| A22 | A22 | 2.5 | 35.0 | 1260 | 1020 | 800 | 12.0 | 570 |
| C3 | A32 | 3.0 | 20.0 | 1230 | 870 | 880 | 22.0 | 620 |

TABLE 3-1-continued

| No. | Steel Composition No. | Treatment of ladle refining process | | Heating Reheating temperature (° C.) | Hot rolling Final rolling temperature (° C.) | Heat treatment conditions | | |
|---|---|---|---|---|---|---|---|---|
| | | Molten steel stirring time (min) | Molten steel standing time after stirring treatment (min) | | | Start temperature (° C.) | Cooling rate (° C./sec) | Stop temperature (° C.) |
| A32 | A32 | 3.0 | 20.0 | 1230 | 870 | 780 | 9.0 | 620 |
| A33 | A33 | 3.0 | 30.0 | 1230 | 870 | 780 | 9.0 | 620 |
| C4 | A40 | 0.5 | 25.0 | 1280 | 930 | <u>690</u> | 8.0 | 520 |
| A40 | A40 | 0.5 | 25.0 | 1280 | 930 | 790 | 8.0 | 520 |
| A41 | A41 | 2.5 | 35.0 | 1280 | 930 | 790 | 8.0 | 520 |
| C5 | A46 | 1.5 | 40.0 | 1230 | 985 | 820 | 13.0 | 450 |
| A46 | A46 | 1.5 | 40.0 | 1230 | 985 | 820 | 13.0 | 560 |
| A47 | A47 | 3.0 | 40.0 | 1230 | 985 | 820 | 13.0 | 560 |

TABLE 3-2

| No. | Steel Composition No. | Microstructure of head portion | | Hardness at head portion (Hv) | | Average number density of coarse Pb oxides (pieces/ 1000 μm$^2$) | Wear test result Wear amount (gf, 700,000 times) | Impact test result Impact value (J/cm$^2$) |
|---|---|---|---|---|---|---|---|---|
| | | 2 mm below head surface | 20 mm below head surface | 2 mm below head surface | 20 mm below head surface | | | |
| C1 | A12 | P | P | <u>295</u> | 265 | Exceeded | 1.750 (large wear due to decrease in hardness) | 18.5 |
| A12 | A12 | P | P | 420 | 390 | Exceeded | 0.980 | 15.8 |
| A13 | A13 | P | P | 420 | 390 | 46 | 0.980 | 17.2 |
| C2 | A21 | P | P | | | Unable to roll rail | | |
| A21 | A21 | P | P | 475 | 440 | Exceeded | 0.620 | 15.3 |
| A22 | A22 | P | P | 475 | 440 | 17 | 0.620 | 16.6 |
| C3 | A32 | <u>P + B + M</u> | <u>P + B</u> | <u>535</u> | 335 | Exceeded | 1.540 (large wear due to formation of B and M) | 5.6 (low toughness due to formation of B and M) |
| A32 | A32 | P | P | 475 | 425 | Exceeded | 0.610 | 15.2 |
| A33 | A33 | P | P | 475 | 425 | 3 | 0.610 | 16.5 |
| C4 | A40 | <u>P + C</u> | <u>P + C</u> | 360 | <u>295</u> | Exceeded | 1.410 (large wear due to formation of C) | 6.2 (low toughness due to formation of C) |
| A40 | A40 | P | P | 405 | 370 | Exceeded | 0.690 | 14.2 |
| A41 | A41 | P | P | 405 | 370 | 40 | 0.690 | 15.8 |
| C5 | A46 | <u>P + B</u> | P | 385 | 410 | Exceeded | 1.750 (large wear due to formation of B) | 15.0 |
| A46 | A46 | P | P | 460 | 410 | Exceeded | 0.540 | 13.0 |
| A47 | A47 | P | P | 460 | 410 | 33 | 0.540 | 14.3 |

As shown in Tables 1-1 to 2-2, in the rails (A1 to A51) of the examples of the present invention, by causing the amounts of the alloying elements such as C, Si, Mn, P, and S to be within the limited ranges, the formation of the pro-eutectoid ferrite, the pro-eutectoid cementite, the bainite structure, and the martensite structure was suppressed and the head surface portion was set to 95 area % or more of the pearlite structure. Therefore, the wear resistance and the toughness were improved compared to the rails (B1 to B8) of the comparative examples.

Furthermore, in the rails (A1 to A51) of the examples of the present invention, by setting the Pb content to be within the limited range, the toughness could be improved compared to the rails (B9 to B14) of the comparative examples.

Figure 7:
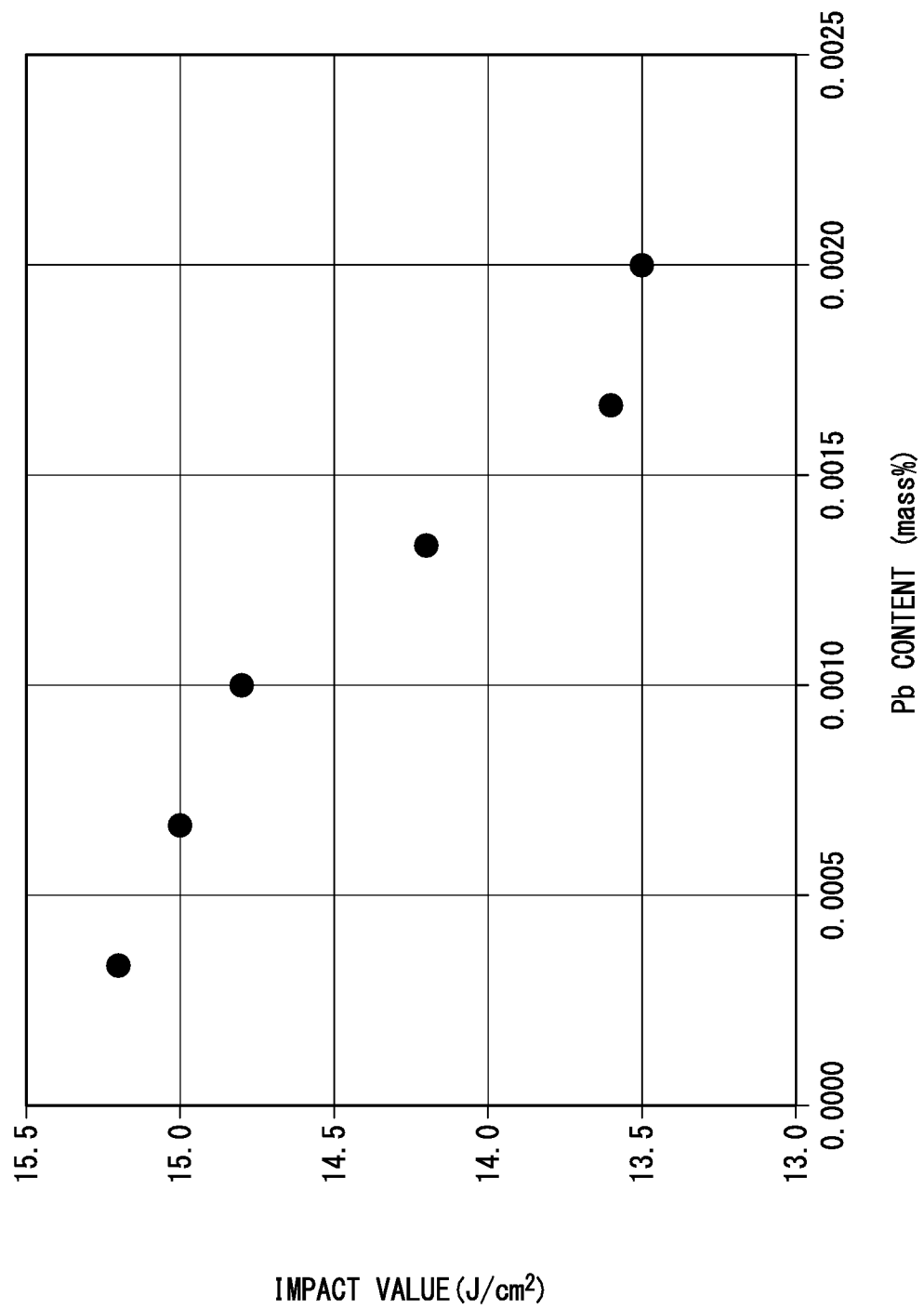
FIG. 7 is a graph showing the relationship between the Pb content of the rail and the impact value of the rail.

FIG. 7 shows the relationship between the Pb content and the impact value of the rails (A27 to A32) of the examples of the present invention. As shown in FIG. 7, in the rails (A27 to A32) of the example of the present invention, by further controlling the Pb content to be 0.0015% or less or 0.0010% or less, the toughness was stably improved.

Figure 8:
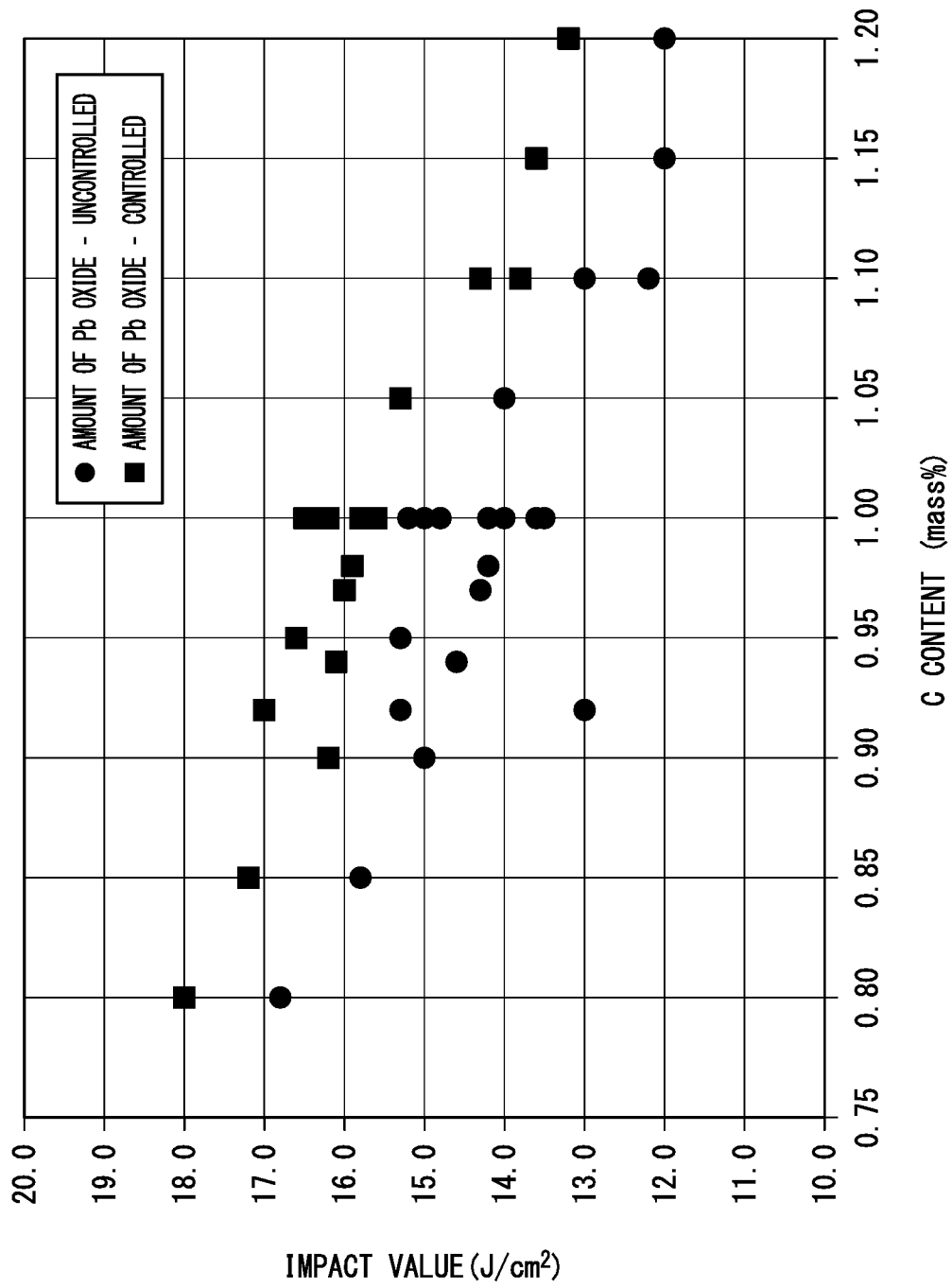
FIG. 8 is a graph showing the relationship between the C content of the rail and the impact value of the rail.

FIG. 8 shows the relationship between the amount of carbon and the impact value of the rails (A10 to A51) of the examples of the present invention. In the rails (A10 to A51) of the examples of the present invention, the toughness could be further improved by controlling the average number density of coarse Pb oxide-based inclusions to be 100 pieces/1000 μm$^2$.

The wear test is an evaluation test that reproduces an actual track. As a result of analysis of the correlation between the wear test result of pearlite steel having a carbon content of 0.75% to 1.20% and the wear resistance evaluation result of the actual track, it was confirmed that in a case where the wear amount of the test was 1.200 gf or less, the wear resistance in the rail having a carbon content of 0.75% to 1.20% in the actual track was improved. Here, the presence or absence of the improvement in the wear resistance was determined using a wear amount of 1.200 gf or less as an evaluation criterion.

The impact test is an evaluation test to confirm the toughness necessary for the rail steel. As a result of analysis of the impact value of pearlite steel (0.75% to 1.20% of C), it was confirmed that in a case where the impact value of the test was 10.0 J/cm$^2$ or more, the toughness of the rail in the actual track was secured. Here, the presence or absence of the toughness securement was determined using an impact value of 10.0 J/cm$^2$ or more as an evaluation criterion.

In addition, as shown in Tables 3-1 and 3-2, by performing the hot rolling and the heat treatment of the head portion under certain conditions, the formation of the pro-eutectoid cementite, the bainite structure, and the martensite structure was suppressed, and thus the hardness of the pearlite structure was secured, thereby improving the wear resistance and toughness. Furthermore, by controlling the stirring time of the molten steel in the ladle refining process and the killing time of the molten steel after the stirring treatment, the average number density of coarse Pb oxide-based inclusions is controlled, thereby further improving the toughness.

Example 2

Using general scrap which is commercially available as a raw material, examples of the present invention were made under the same manufacturing conditions as in Example 1, and the configuration and properties were evaluated by the same method as in Example 1. The results are shown in Tables 4-1 and 4-2.

TABLE 4-1

| | Chemical composition (mass %) (remainder: Fe and impurities) | | | | | | | Notices regarding manufacturing method after |
|---|---|---|---|---|---|---|---|---|
| No. | C | Si | Mn | P | S | Pb | Others | hot rolling |
| D1 | 1.00 | 0.54 | 0.91 | 0.0100 | 0.0060 | 0.0020 | Cr: 0.15, M: 0.010, Cu: 0.20, Ni: 0.06 V: 0.0015, Nb: 0.0010, Ti: 0.0100, Al: 0.0140, N: 0.0080 | Heat treatment |
| D2 | 0.99 | 0.55 | 0.92 | 0.0110 | 0.0045 | 0.0015 | Cr: 0.16, M: 0.010, Cu: 0.20, Ni: 0.07 V: 0.0015, Nb: 0.0010, Ti: 0.0080, Al: 0.0130, N: 0.0100 | Heat treatment |
| D3 | 0.99 | 0.55 | 0.92 | 0.0110 | 0.0045 | 0.0015 | Cr: 0.16, M: 0.010, Cu: 0.20, Ni: 0.07 V: 0.0015, Nb: 0.0010, Ti: 0.0080, Al: 0.0130, N: 0.0100 | Heat treatment |
| D4 | 1.00 | 0.56 | 0.88 | 0.0120 | 0.0080 | 0.0010 | Cr: 0.15, M: 0.015, Cu: 0.22, Ni: 0.05 V: 0.0013, Nb: 0.0010, Ti: 0.0080, Al: 0.0120, N: 0.0080 | Heat treatment |
| D5 | 0.99 | 0.51 | 0.88 | 0.0100 | 0.0075 | 0.0007 | Cr: 0.15, M: 0.010, Cu: 0.23, Ni: 0.06 V: 0.0010, Nb: 0.0015, Ti: 0.0120, Al: 0.0140, N: 0.0075 | Heat treatment |
| D6 | 0.99 | 0.51 | 0.88 | 0.0100 | 0.0075 | 0.0007 | Cr: 0.15, M: 0.010, Cu: 0.23, Ni: 0.06 V: 0.0010, Nb: 0.0015, Ti: 0.0120, Al: 0.0140, N: 0.0075 | Heat treatment |
| D7 | 1.00 | 0.52 | 0.87 | 0.0090 | 0.0060 | 0.0003 | Cr: 0.14, M: 0.015, Cu: 0.21, Ni: 0.07 V: 0.0015, Nb: 0.0015, Ti: 0.0070, Al: 0.0130, N: 0.0090 | Heat treatment |

TABLE 4-2

| | Microstructure of head portion | | Hardness at head portion (Hv) | | Average number density of coarse Pb oxides (pieces/1000 μm$^2$) | Wear test result Wear amount (gf, 700,000 times) | Impact test result Impact value (J/cm$^2$) |
|---|---|---|---|---|---|---|---|
| No. | 2 mm below head surface | 20 mm below head surface | 2 mm below head surface | 20 mm below head surface | | | |
| D1 | P | P | 445 | 415 | Exceeded | 0.630 | 12.5 |
| D2 | P | P | 450 | 420 | Exceeded | 0.620 | 13.0 |
| D3 | P | P | 450 | 420 | 41 | 0.620 | 14.3 |
| D4 | P | P | 442 | 415 | Exceeded | 0.640 | 13.5 |
| D5 | P | P | 435 | 420 | Exceeded | 0.630 | 13.8 |
| D6 | P | P | 435 | 420 | 14 | 0.630 | 15.2 |
| D7 | P | P | 440 | 415 | Exceeded | 0.630 | 14.0 |

As shown in Table 4-2, even if the general scrap which is commercially available was used as the raw material, a rail having excellent properties was obtained by controlling the Pb content to be within a predetermined range.

BRIEF DESCRIPTION OF THE REFERENCE SYMBOLS

1: top head portion
2: corner head portion
3: head portion of rail
3a: head surface portion (a region from the surfaces of corner head portions and a top head portion to a depth of 20 mm)
4: rail specimen
5: wheel specimen
6: cooling air nozzle

The invention claimed is:

1. A rail manufactured by melting steel using an electric furnace comprising, as a chemical composition, by unit mass %:
C: 0.75% to 1.20%;
Si: 0.10% to 2.00%;
Mn: 0.10% to 2.00%;
P≤0.0250%;
S≤0.0250%;
Ph: 0.0003% to 0.0020%;
a group a: one or two of Cr: 0% to 2.00% and Mo: 0% to 0.50%;
a group b: Co: 0% to 1.00%;
a group c: B: 0% to 0.0050%;
a group d: one or two of Cu: 0% to 1.00% and Ni: 0% to 1.00%;
a group e: one or two or more of V: 0% to 0.50%, Nb: 0% to 0.0500%, and Ti: 0% to 0.0500%;
a group f: one or two or more of Mg: 0% to 0.0200%, Ca: 0% to 0.0200%, and REM: 0% to 0.0500%;
a group g: Zr: 0% to 0.0200%;
a group h: Al: 0% to 1.0000%;
a group i: N: 0% to 0.0200%; and
a remainder including Fe and impurities,
wherein 95 area % or more of a region from an outer surface of a head portion to a depth of 20 mm is a pearlite structure,
a hardness in the region from the outer surface of the head portion to the depth of 20 mm is in a range of dv 300 to 500,
an impact value is 10.0 J/cm² or more, and
the hardness in the region from the outer surface of the head portion to the depth of 20 mm is obtained by measuring the Vickers hardness at 10 or more points under a load of 98 N at each of the measurement position of a depth of 2 ram from the outer surface of the head portion and the measurement position of a depth of 20 mm from the outer surface of the head portion, and calculating the average value thereof.

2. The rail according to claim 1,
wherein an average number density of Pb oxide-based inclusions having a grain size of 1.0 μm to 5.0 μm is 100 pieces/1000 μm² or less, in a cross-section of the region from the outer surface of the head portion to the depth of 2 mm to 20 mm.

3. The rail according to claim 2 comprising, as the chemical composition, by unit mass %:
one group or two or more groups of,
a group a: one or two of Cr: 0.10% to 2.00% and Mo: 0.01% to 0.50%;
a group b: Co: 0.01% to 1.00%;
a group c: B: 0.0001% to 0.0050%;
a group d: one or two of Cu: 0.01% to 1.00% and Ni: 0.01% to 1.00%;
a group e: one or two or more of V: 0.01% to 0.50%, Nb: 0.0010% to 0.0500%, and Ti: 0.0030% to 0.0500%;
a group f: one or two or more of Mg: 0.0005% to 0.0200%, Ca: 0.0005% to 0.0200%, and REM: 0.0005% to 0.0500%;
a group g: Zr: 0.0001% to 0.0200%;
a group h: Al: 0.0050% to 1.0000%; and
a group i: N: 0.0050% to 0.0200%.

4. The rail according to claim 1 comprising, as the chemical composition, by unit mass %:
one group or two or more groups,
a group a: one or two of Cr: 0.10% to 2.00% and Mo: 0.01% to 0.50%;
a group b: Co: 0.01% to 1.00%;
a group c: B: 0.0001% to 0.0050%;
a group d: one or two of Cu: 0.01% to 1.00% and Ni: 0.01% to 1.00%;
a group e: one or two or more of V: 0.01% to 0.50%, Nb: 0.0010% to 0.0500%, and Ti: 0.0030% to 0.0500%;
a group f: one or two or more of Mg: 0.0005% to 0.0200%, Ca: 0.0005% to 0.0200%, and REM: 0,0005% to 0.0500%;
a group g: Zr: 0.0001% to 0.0200%;
a group h: Al: 0.0050% to 1.0000%; and
a group i: N: 0.0050% to 0.0200%.

* * * * *